(12) United States Patent
Pucher

(10) Patent No.: US 7,937,349 B2
(45) Date of Patent: May 3, 2011

(54) METHOD FOR TRAINING A SYSTEM TO SPECIFICALLY REACT ON A SPECIFIC INPUT

(76) Inventor: Max J. Pucher, Zug (CH)

(*) Notice: Subject to any disclaimer, the term of this patent is extended or adjusted under 35 U.S.C. 154(b) by 874 days.

(21) Appl. No.: 11/845,624

(22) Filed: Aug. 27, 2007

(65) Prior Publication Data

US 2008/0114710 A1 May 15, 2008

Related U.S. Application Data

(60) Provisional application No. 60/865,078, filed on Nov. 9, 2006.

(30) Foreign Application Priority Data

Aug. 24, 2007 (EP) .................................. 07016599

(51) Int. Cl.
*G06N 5/00* (2006.01)
(52) U.S. Cl. ............... 706/45; 706/14; 706/15; 706/46; 706/62; 707/912; 707/944; 707/952
(58) Field of Classification Search .................. None
See application file for complete search history.

(56) References Cited

U.S. PATENT DOCUMENTS

| | | | |
|---|---|---|---|
| 5,274,737 A * | 12/1993 | Shinoda | 704/245 |
| 5,946,674 A | 8/1999 | Nordin et al. | |
| 6,848,109 B1 | 1/2005 | Kühn | |
| 6,968,364 B1 | 11/2005 | Wong et al. | |
| 6,968,511 B1 | 11/2005 | Robertson et al. | |
| 7,051,282 B2 | 5/2006 | Marcjan | |
| 2002/0042859 A1 * | 4/2002 | Lowry | 711/100 |
| 2002/0111922 A1 | 8/2002 | Young et al. | |
| 2002/0169658 A1 | 11/2002 | Adler | |
| 2003/0052789 A1 | 3/2003 | Colmenarez et al. | |

(Continued)

FOREIGN PATENT DOCUMENTS

EP 1069520 1/2001

(Continued)

OTHER PUBLICATIONS

Maruster, Laura; "A Machine Learning Approach to Understand Business Processes;" Library Technische Universiteit Eindhoven; Aug. 27, 2003; pp. 1-155.

(Continued)

*Primary Examiner* — Omar F Fernandez Rivas
(74) *Attorney, Agent, or Firm* — Ryan A. Schneider, Esq.; Troutman Sanders LLP

(57) ABSTRACT

A method for training a system to specifically react on a specific input. The method can include defining a set of binary data structures, each representing a real-world component, item, or virtual object; storing each data structure as a binary pattern; creating uniquely identifiable copies of the data structures to represent individual instances of the components, items, or virtual objects; creating a virtual state space of the components, items, or virtual objects by grouping them as relevant for a specific situation; receiving an input to change a status or an attribute value of at least one of the components, items, or virtual objects; storing the received changes in a new version of the applicable data structure instance; analyzing similarities of the stored binary patterns related to a particular action performed; and if a matched binary pattern is identified, proposing at least one possible action related to the matched binary pattern.

19 Claims, 16 Drawing Sheets

U.S. PATENT DOCUMENTS

| | | | |
|---|---|---|---|
| 2003/0085918 | A1 | 5/2003 | Beaumont et al. |
| 2003/0220906 | A1* | 11/2003 | Chickering ............. 707/2 |
| 2004/0085364 | A1 | 5/2004 | Keely et al. |
| 2004/0176968 | A1 | 9/2004 | Syed et al. |
| 2004/0199573 | A1* | 10/2004 | Schwartz et al. ............. 709/201 |
| 2004/0216053 | A1 | 10/2004 | Sponheim et al. |
| 2004/0267395 | A1 | 12/2004 | Discenzo et al. |
| 2005/0010589 | A1 | 1/2005 | Novak et al. |
| 2005/0060351 | A1 | 3/2005 | Rahman |
| 2005/0091609 | A1 | 4/2005 | Matthews et al. |
| 2005/0108022 | A1 | 5/2005 | Bhattacharya et al. |
| 2005/0154754 | A1 | 7/2005 | Sheldon et al. |
| 2005/0160374 | A1 | 7/2005 | Bailey et al. |
| 2005/0257042 | A1 | 11/2005 | Sierra et al. |
| 2006/0064649 | A1 | 3/2006 | Weber et al. |
| 2006/0090130 | A1 | 4/2006 | Bent et al. |
| 2006/0093208 | A1* | 5/2006 | Li et al. ............. 382/159 |
| 2006/0101353 | A1 | 5/2006 | Clark et al. |
| 2006/0106637 | A1 | 5/2006 | Johnson et al. |
| 2006/0111931 | A1 | 5/2006 | Johnson et al. |
| 2006/0190834 | A1 | 8/2006 | Marcjan |
| 2006/0224992 | A1 | 10/2006 | Rossi et al. |
| 2006/0230354 | A1 | 10/2006 | Jennings et al. |
| 2006/0230361 | A1 | 10/2006 | Jennings et al. |
| 2006/0248404 | A1 | 11/2006 | Lindsay et al. |
| 2006/0248471 | A1 | 11/2006 | Lindsay et al. |
| 2007/0162447 | A1* | 7/2007 | Joshi et al. ............. 707/7 |
| 2007/0265991 | A1* | 11/2007 | Collobert et al. ............. 706/16 |

FOREIGN PATENT DOCUMENTS

| | | |
|---|---|---|
| EP | 1521152 | 4/2005 |
| WO | WO 00/70481 | 11/2000 |
| WO | WO 01/99011 | 12/2001 |
| WO | WO 02/41624 | 5/2002 |
| WO | WO 02/069142 | 9/2002 |
| WO | WO 02/073860 | 9/2002 |
| WO | WO02097588 | 12/2002 |
| WO | WO2005020044 | 3/2005 |

OTHER PUBLICATIONS

Liao, Bei-Shui; Huang, Hua-Zin; and Gao, Ji; "An Extended BDI Agent with Policies and Contracts;" Research Center of Language and Cognition, Zhejiang University; 2006; pp. 94-104.

Ram, Sudha; and Liu, Jun; "An Agent-Based Approach for Sourcing Business Rules in Supply Chain Management;" International Journal of Intelligent Information Technologies; 1(1); Jan.-Mar. 2005; pp. 1-16.

Li, Li; Wu, Baolin; and Yang, Yun; "Agent-Based Approach for Dynamic Ontology Management;" KES 2005; pp. 1-7.

Guo, Yin-Zhang; Zhang, Guo-You; Qiao, Gang-Zhu; Xu, Yu-Bin; "Cooperation Based on the Multiphase Negotiation Policy Model of Mas in Dynamic Alignment Among Enterprises;" Proceedings of the Third International Conference on Machine Learning and Cybernetics, Shanghai; Aug. 26-29, 2004; pp. 292-296.

Kim, Hoon; Kang, Yang-Koo; Kwon, Byung-Jin; Hwang, Dae-Joon; "Managing and Computational Business System Model for Intelligent Protection Based on Agent;" IASTED Conference of Artificial intelligence and Applications; Feb. 2004; pp. 760-764.

Wickramasinghe, L.K.; Amarasiri, R. and Alahakoon, L.D.; A Hybrid Intelligent Multiagent System for E-Business; Computational Intelligence; vol. 20, No. 4; 2004; pp. 603-623.

Fang, Ji Xiao; Junhua, Xu; Hua, Zhu; Zuzhao, Liu; "A Realizable Intelligent Agent Model Applied in Dynamic E-Business;" IEEE; 2003; pp. 1-7.

Liu, J. and You, J.; "On Agent Based Visual Data Mining for Intelligent Web Browsing with E-Commerce Applications;" IEEE; vol. 2; 2002; pp. 936-939.

Deschaine, Larry M., McCormack, Jenifer, Pyle, Dorian; and Francone, Frank; "Genetic Algorithms and Intelligent Agents Team Up: Techniques for Data Assembly, Preprocessing, Modeling, and Optimizing Decisions;" PC AI; May-Jun. 2001; pp. 35-42.

Cuthbert, Laurie; Ryan, Damian; Tokarchuk, Laurissa; Bigham, John and Bodanese, Elaine; "Using Intelligent Agents to Manage Resources in 3G Networks;" Journal of the Institution of British Telecommunications Engineers; Oct.-Dec. 2001; pp. 39-44.

Edala, Narasimba Rao; Garay, Matthew; Narayanan, S.; and Eggleston, Robert G.; "A Distributed Simulation Environment tor Analyzing Adaptive Agent Behavior in Supervisory Control System;" Proceedings of the 1999 Summer Computer Simulation Conference; 1999; pp. 347-352.

Gilman, C.; Aparicio, M.; Barry, J.; Curniak, T.; Lam, H. and Rammath, R.; "Integration of Design and Manufacturing in a Virtual Enterprise Using Enterprise Rules, Intelligent Agents, STEP, and Workflow;" Proc. SPIE—Int. Soc. Opt. Eng.; 1997; pp. 160-171.

"Microsoft Center for Information Work;" May 2006; pp. 1-8.

Pigot, Helene et al., "The Role of Intelligent Habitats in Upholding Elders in Residence", 5th International Conference on Simulations in Biomedicine, Apr. 4, 2003, pp. 497-506.

Das, Sajal K. et al., "The Role of Prediction Algorithms in the Mavhome Smart Home Architecture", IEEE Wireless Communications, Dec. 31, 2002, pp. 77-84.

European Search Report for European Application No. EP07016599 dated Mar. 6, 2008.

* cited by examiner

Fig 1-A:
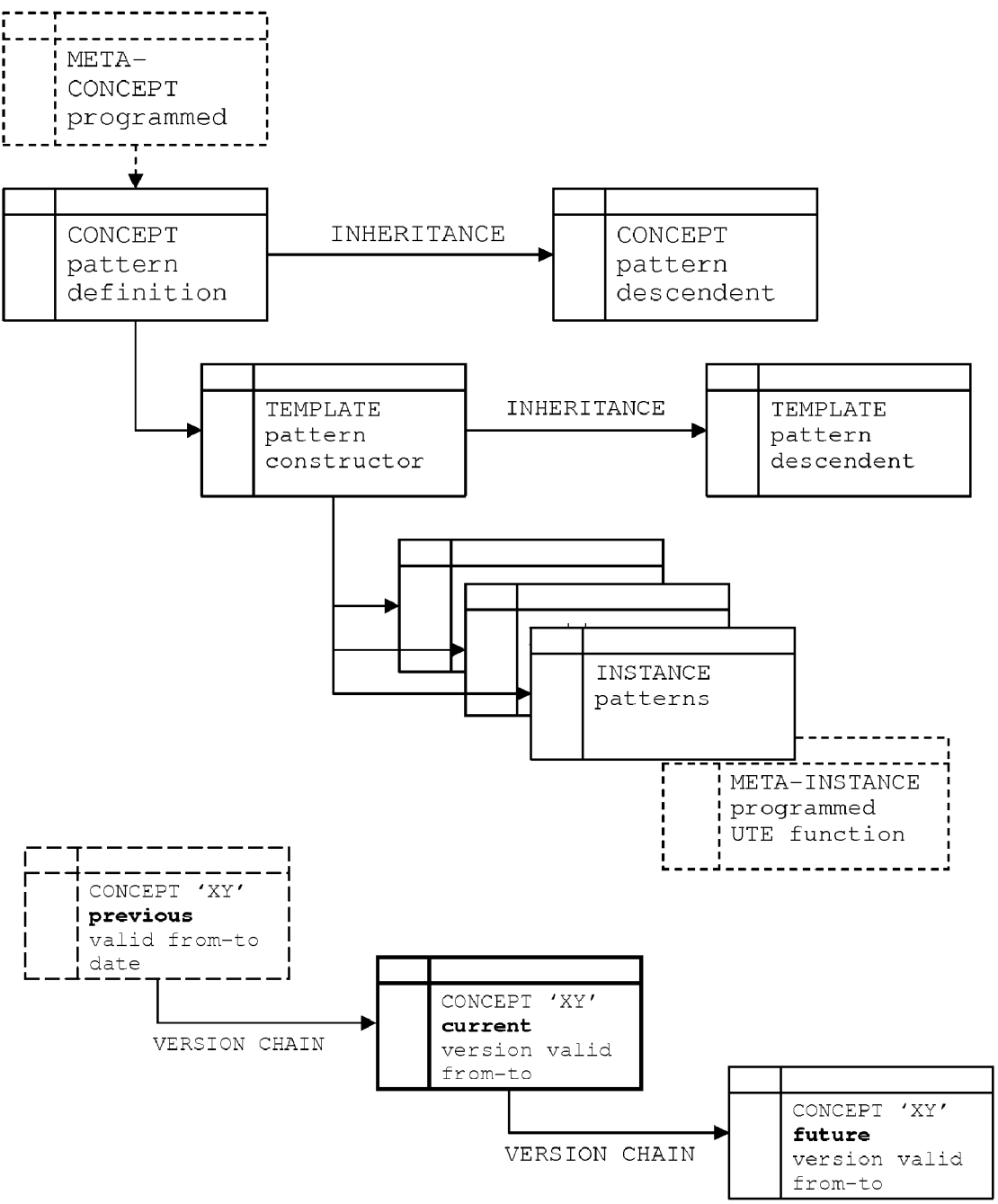

FIG: 10:

METHOD FOR TRAINING A SYSTEM TO SPECIFICALLY REACT ON A SPECIFIC INPUT

CROSS REFERENCE TO RELATED APPLICATION

This application claims benefit under 35 U.S.C. §119(e) of U.S. Provisional Patent Application Ser. No. 60/865,078 filed 9 Nov. 2006, and claims the benefit of priority to EP application 07016599.8, filed 24 Aug. 2007, which priority applications are hereby incorporated by reference.

BACKGROUND OF THE INVENTION

1. Field of the Invention

The invention relates to a method for training a system to specifically react on a specific input. More specifically the invention relates to real-time transductive training from user Interaction. The invention also relates to a computer system designed to execute the described method. Also a computer program product enabling the computer system to execute the method is part of the invention.

2. Brief Summary of the Invention

The invention deals with the problem to train a system to specifically react on a specific input from an user or from the environment. The system should be trained to make it ready for quickly identify the intention of the user or the desired action based on the values of a specific set of environmental parameters. After identification the trained system for example proposes or executes, based on a specific input or on specific values of environmental parameters, a specific action.

The invention describes a method for transductive training of a system by an user interaction that defines business and control applications as freely definable information structures of Descriptive Concept Patterns (DCP) and related pattern structures virtually representing a real-world environment of people, machines, robots, physical objects or abstract business entities and thus enabling transductive training via its interaction with users. The trained system or User-Trained Environment (UTE) enables user interaction with those stored patterns by users manipulating objects with sensors providing control signals, by analyzing video feeds, by analyzing document images, or by keyboard or touch-screen input. The UTE enables multiple User-Trained Agents (UTA) to learn machine control operations, business processes, data manipulation, interactive applications, communication and document-use by means of real-time Transductive Training from user interaction with those DCPs linked to the real world objects.

An UTE user—which can be any of or other than a machine operator, robot trainer, business clerk, business analyst or IT specialist—describes by means of physical interaction, written language or automated capture of business information freely-definable business or other concept patterns (DCPs) that are stored.

In the UTE, machines, physical objects, plant operations, applications and processes are modeled as an open-world state-space of operations- or business-relevant concepts. The training on the items is performed by user interaction—referred to as Activity Mining (AM)—on the state-space though mapped sensors and/or input devices rather than posthumous data mining.

The UTE enables the user to interact with the Descriptive Concept Patterns (DCP) and collect training information by performing activities that change the state of relevant patterns, hence Activity Mining. Activity Mining is performed either by user action on a machine or by direct user input that modify the state-space of the related DCPs, relationship patterns, item location patterns, machine function patterns, user activity patterns, process patterns, partial-order patterns, presentation patterns, real-time transaction data patterns and previously trained knowledge patterns.

Training and execution are both performed within the productive environment of the UTE without the need for intermediate knowledge engineering. A machine, robotic, operational or business activity that reaches a point of exception, meaning that it has no previously trained decision pattern that matches the current state-space pattern, will stop and wait for user training. The User-Trained Agent (UTA) is able to execute the trained knowledge on different instances of the same DCPs as well as by means of identified analogies or similarities of DCPs in the pattern storage.

One object of the invention is a method for training a system to specifically react on a specific input in real-time. Another object of the invention is a computer system designed to execute the method. A further object of the invention is a computer program product enabling the computer system to execute the method.

According to the invention the first object is solved by a method for training a system to specifically react on a specific input, comprising the steps: defining a set of binary data structures, whereas each data structure represents an abstract description of a certain type of a real-world component, item or a virtual object, comprising the features of said type of component, item or object per se, its possible states, its attributes, possible actions to be performed, and possible relationships between said components, items or virtual objects, storing each of the data structures directly as a binary pattern in a computer memory or a disk memory, creating uniquely identifiable copies of the binary data structures to represent an individual instance of said types of components, items or virtual objects, creating a virtual state space of said individual types of components, items or virtual objects by grouping them as relevant for the specific situation, receiving via keybord input, sensor devices or other technical means changes of status or attribute values of at least one of said components, items or virtual objects, storing said received changes as a new version of the respective data structure, representing the changed status and transition process of said individual components, items or virtual objects, analyzing similarities of said binary patterns stored in said computer memory or disk memory related to a particular action performed, searching for a match in said binary patterns of said data structures, and if at least one repeating binary pattern of said data structures is identified, at least one possible action related to the matched binary pattern is proposed to an operator or performed automatically.

According to the invention binary data structures, representing an abstract description of a certain type of a real-world component, are directly stored as a binary pattern in a computer memory or a disk memory. The data structures are not described as compiled machine-code or interpreted logic language based on a Boolean logic with data stored in database tables or as a rule-based expert or business process system that requires knowledge to be encoded in fact and belief knowledge rules—whether coded ore induced—but as freely definable binary clusters of concept patterns and pattern structures virtually representing a real-world system of machines, robots, physical objects or abstract business entities that enable multiple User-Trained Agents (UTA) to learn machine control operations, business processes, data manipulation, interactive applications and communication and document use by means of real-time transductive training from user interaction with those patterns. This method dramatically expands and innovates on the ideas of continuous planning agents to learn partial-order plans using a least-commitment strategy from real-time user interaction. Without any compilation or interpretation the access to the binary patterns of the data structures is much faster compared with known systems.

By creating uniquely identifiable copies of the binary data structures to represent individual instances of the types of components and creating a virtual state space of said individual types of components by grouping them as relevant for the specific situation, and storing received changes as a new version of the respective data structure, similarities of the binary patterns stored and related to a particular action performed could be found in real-time by analyzing directly the stored binary clusters.

A User-Trained Agent or UTA used in the UTE is a new kind of agent as it not only monitors the state-space for changes to act, but directly learns from user action on abstract concepts in the state-space in real-time. Such a new agent has to be able to observe the state-space in real-time and to identify each element, its value, location and references in the state-space and map it to user-role action and calculate a relevance of properties to the perceived action in real-time.

The UTA agent technology can observe the data-patterns and their meta-data concept definitions within the execution environment without being assigned predetermined and action sequences from an agent knowledge base. Therefore, the UTA can deal in real-time with non-deterministic or stochastic interference, as well as uncertain, partially observable, non-strategic, non-sequential, non-discrete and non-static state-spaces.

The UTA radically innovates on the general idea of the (non-linear) Transductive Support Vector Machine. The UTA does learn from the actions of the user, but the advance is the learning on the actions of the user in relation to a state-space. In state-of-the-art semi-supervised learning, transduction or transductive inference is reasoning from observing specific training cases. In contrast, induction is reasoning from observed training cases to general rules, which are stored in a knowledge base and later applied in an execution environment. The transductive model can handle very complex state-space situations that are not achievable by any inductive model. Suggesting that solving a specific problem is more important than inferring a more general function by induction, a Transductive Support Vector Machine TSVM needs points in a finite dimensional, real-valued vector space, i.e. it needs measurements to be vectors of real numbers. The UTA engine is different to the TSVM, as there no such a restriction as it evaluates only the differences in definition, relevance, stress and values between data points in an open-world state-space. The UTA learns decision patterns for n-dimensional state-spaces, general metric state spaces, or even semi-metric state-spaces by identifying action-relevant patterns in the state space regardless of their actual real-world meaning. The meaning is only necessary for an operator to understand what the UTA has learned.

For practical flexibility and more accurate process knowledge, the UTE utilizes a root container to reference all relevant business or physical operation DCP instances that represent a state-space of patterns consisting of positive literals that must be ground- and function-free. UTE concepts allow an open-world assumption meaning that not all states that are currently unknown must be false or that all concepts participating in the case must be known beforehand. In the UTE, the user can add new concept patterns and new states of concept patterns at any time. Goals and mandatory functions are represented as a partially specified state-space or sequence, represented by a conjunction of positive ground literals defined by means of a pattern query language (PQL).

In UTE such actions are trained by the user by automatically identifying over time the not-relevant elements and type-relevant elements of the state-space for a particular repeating action. Through continuous input by the user, the UTA is capable of learning from the user activity what these pre-conditions are without any additional information. In difference to state-of-the-art agent systems, the UTE does not use parseable or interpreted action description languages such as STRIPS, ADL or PDDL to describe possible actions.

The UTA has the advantage that activities do not have to be performed in a rigid chronological sequence but can be dissected into several sub-plans or activities. A good example is how you might clean a car. There are only a few required chronological steps such as 'wash before wax' while others can be performed at any sequence. This is very difficult to describe in a flowchart graph with complex resulting decision blocks. When it starts to rain at any time during the process of cleaning the car, it does not require a lot of intelligence to turn to cleaning the interior until it stops raining. State-of-the-art BPM systems and most AI systems have a serious problem to deal with random events that can happen at any time, foreseeable or not.

The UTA does create an implicit order of actions within a state-space by means of decision patterns but does not use partial-order planning concepts such as GRAPHPLAN, SATPLAN or BLACKBOX.

The UTA is also an innovation on what is called a CONTINUOUS PLANNING AGENT or CPA that is in principle able to react to events and can revise plans in real-time as new work-items or goals are added. A CPA is capable of beginning to execute a plan before it is complete and revise the plan as it is executed. The UTA innovates on the idea of a CPA in the sense that it asks the UTE user for training input in case of indeterminable decisions and learns from those interactions without the need for a knowledge engineer to encode new ACTION items.

The UTA is trained by means of exceptions that do not match a previously trained decision-pattern for the state-space. Such exception-based learning is considered by CASE BASED PLANNING in which plans are computed and reused as an analogy based on similar encountered exceptions but in difference to the UTE not interactively user trained.

The UTE innovates on the state-of-the-art and solves known performance problems by using a binary pattern structure that represents concepts rather than trying to interpret knowledge from program language. The UTE is modeled after the information clusters in the human brain where knowledge is stored in patterns and pattern relationships. Decisions in the human brain are not flowcharts of Boolean black-white decisions but emotionally-probabilistic shades of grey based on an analogue summary value of past experiences. The UTE is trained by human operator decisions on the state-space and learns to act the same way without knowing or trying to understand why. It only recognizes similar state-space situations without logical reasoning. This is apparently how humans make decisions as well.

The UTA advances the state-of-the-art of multi-agent systems, as current agents need to communicate which each other to cooperate or compete, by means of a rule-based reasoning engine that negotiates activities depending on context and prevailing conditions. Multiple UTAs however, do not communicate but see each other's actions as stochastic state-space changes. The UTA acts independently on state-spaces or subsets thereof much as the human-brain does. State-of-the-art agents require specialized encoded knowledge sets and communicate to create an overall workflow, such as the ADEPT system. These systems require a data-gathering, analysis, design and rule creation phase to determine the partial-order plans of the overall business process in a Procedural Reasoning System.

The UTE is not a multi-agent system where an agent is classified by reactivity, pro-activeness and social ability. These attributes assume that each agent has some ingrained knowledge that he uses to execute a certain task and communicates with other agents to some extent. The UTA is in difference a software component that monitors a state-space that contains items with associated possible actions and learns from the user interaction with those.

In the UTE, the UTAs cooperate without the need for knowing each other and the requirement to create joint plans. There is NO direct agent-to-agent communication and coordination necessary except for generic notification events. By means of agents observing different state-spaces and having different role authority, a segmentation of any complex business case is automatically achieved.

User-to-agent, agent-to-agent, and agent-to-user communication is not explicit by means of a predefined communications protocol but can be performed by means of any pattern that becomes part of the stochastic state-space, such as language (vocal, text or data and even XML), or images (documents, pictures or video). Previously trained patterns will cause either to goal-mismatch events or change the state of any object in a state-space monitored by an UTA. Language patterns can be stereotyped to reference queries, action requests, acknowledgements or commitments without induction as of to why that is the case.

The User-Trained Environment or UTE performs as a distributed peer-to-peer system with a central versioning concept repository to store the descriptive concept patterns (DCPs). The UTE represents a distributed peer-to-peer system of identical node-programs that select binary representations of concept and instance patterns from a central, version-controlled repository based user authorization or as selected by the trained knowledge patterns.

An UTE user—which can be any of or other than a machine operator, robot trainer, business clerk, business analyst or IT specialist—describes by means of physical interaction, written language or automated capture of business information freely-definable business or other concept patterns (DCPs) that are stored in a proprietary bitmap format in a central pattern storage (repository) and identically executed as-is by the UTE transactional kernel code without transcoding or compilation on every operating system that the UTE kernel runs on.

In the UTE, machines, physical objects, plant operations, applications and processes are modeled as an open-world state-space of operations- or business-relevant concepts identified by bitmap-patterns, whose state is relevant to the summary state of the process, plan or case.

In a preferred embodiment the method further comprises storing the received changes as a new version of the respective data structure while retaining the previous version in said binary pattern in said computer memory or disk memory. This enables the evolution of the respective data structure.

According to another embodiment of the invention in a training phase actions performed on the individual components, items or virtual objects are received by an identified type of operator via keyboard input, sensor devices or other technical means, and a decision pattern map of all data structures is created in the virtual state space for each repeatedly received action. During this training phase the identified operator trains the system on specific actions related to a specific input. To create a decision pattern map of the data structures for each repeatedly received action will allow a faster identification of later similar data structures. The training on the items could be performed by real-time user interaction—referred to as Activity Mining (AM)—on the state-space though mapped sensors and input devices rather than posthumous data mining.

According to another embodiment during the training phase only changes in the virtual state space caused by a specific action are collected and other automatically generated changes are excluded from collection. In this case the system is only trained on specific changes or specific input. The changes caused by a specific action are preferably distinguished from other changes by marking or by a heuristic method scanning the actions done for typical characteristics.

Improving the invention the claimed method further comprises the steps: storing snap-shot information from the individual binary data structures in the virtual state space of the point in time when said specific operator performing a specific action as abstract causal data patterns, calculating a mathematical distance between said causal data patterns to create pattern clusters, reducing the amount of data needed to search for recurring patterns in said virtual state space, building a decision tree using said causal pattern clusters using the calculated mathematical distance, using said decision tree to identify an abstract causal data pattern in the individual data structures of an individual state space upon the occurrence of a change event in the state space, using the abstract causal data in the decision tree to find a similar pattern in another individual state space, using gathered training information stored in the decision tree from operator actions in previous situations to propose probable actions to the same kind of operator in future similar situations without intermediate offline processing of collected training data.

The mathematical distance may be calculated by using matrices. The matrix distance function is a function of the row and column averages. The matrices are obtained by comparing the features of two data elements or structures.

The decision tree could be built in a recursive way. Input for a possible algorithm is a selection of raw training data from the real-time state-space. For each active feature, a clustering algorithm is performed. Each clustering may then be scored using three parameters. The cluster stress, measuring the effort needed to keep points in one cluster together and to keep different clusters apart. The purity, measuring the number of different user actions that are merged together in one cluster (ideally there would only be one user action per cluster). The cluster height, measuring the minimum of the variational distance between two clusters.

The feature whose clustering gives the best score is then used to separate the selection of input data. For each such cluster one of three possible actions may be performed. If the cluster is too small (determined by the Minimal Cluster Threshold attribute of the UTA), then it is ignored. If the cluster is pure enough (determined by the Purity Threshold attribute of the UTA), then it is used as a final node of the decision tree. Else, the elements of the cluster are used as the new selection and the decision tree builder is called with this selection.

The result of this algorithm is a decision tree. At every internal node of the decision tree, the deciding feature is stored. At every leaf node, one or more data clusters are stored.

In a further embodiment in the method the at least one action corresponding to said identified binary pattern is proposed or caused only if the number of found repeated patterns exceeds a given specific threshold value. This helps to avoid an unpredictable behavior of the system.

According to another embodiment of the invention the method further comprises the steps: defining relevant actions of said data structures and storing changed binary data structures as new versions only if at least one of said relevant actions is performed. With these steps the system is trained on specific actions related to specific data structures. The amount of stored data structures is decreased.

In principal all known methods for communicate with a computer system are possible to define the set of binary data structures. Preferably, the step of defining said set of binary data structures is performed via a keyboard, via sensory devices, via voice or via image recognition.

According to a preferred embodiment each of the binary data structures is stored directly and identically in a binary data format to computer memory or computer disk, comprising binary sequences encoding the type, a global unified identifier, a version or sequence number and a transaction ID for said structure that describes a component, item or virtual object. With such a data format each of the binary data structures and it version is uniquely identifiable. Further, the evolution of each of the data structures is available with this data structure.

To avoid an unauthorized access to the system by not authorized users or malicious programs like viruses, worms or similar, the binary data structures are stored in said computer memory or disk memory in an encrypted format. The encryption key is private to the owning node or to the complete domain. This means that access to the pattern storage is not possible from the outside as key values cannot be read and record content can not be decoded except by the authenticated program or owner from within the system with the correct role and policy.

The description of each binary data structure, describing components, items or virtual objects, comprises preferably attributes, attribute properties, possible value ranges of the attributes, access privileges and policies, state definitions, state pre- and post constraints, state transitions, transition change events, state changing event listeners, action definitions, action mapping to system internal functions, state changes and child and parent relationship definitions describing references to other data structures.

To increase the performance on read/write in a preferred embodiment the set of binary data structures is stored on a computer memory and on a disk memory.

According to another embodiment of the training method the binary data structures or the binary data patterns are exchanged via internet or other data lines between different computer systems. Preferably, all records are sent in encrypted format through the network.

In another preferred embodiment of the training method the computer memory is a computer random access memory. A computer random access memory takes the form of integrated circuits that allow the stored data to be accessed in any order. Any piece of data can be returned in a constant time regardless of its physical location. The access to the binary data pattern is accelerated.

The second object of the invention is solved with a computer system comprising at least one processor, a computer random access memory or disk memory, a number of hardware interfaces for connecting individual components or items, and an operator input/output interface to interact with virtual objects, designed to execute the method as described above.

According to a preferred embodiment the computer system further comprises a computer network interface to link multiple computer systems.

The third object of the invention is solved with a computer program product enabling a computer to execute the method as described above.

This invention employs the following distinctive differences to the state-of-the-art:

In a state-of-the-art artificial intelligence applications for process management the real world is analyzed, modeled and created by means of encoding the features of real world items and the way we interact with them into logical rules. Analytic programming in all its forms (i.e. Java, C++, Smalltalk, ILOG rules, and other AI rule languages) creates classes of concepts and maps them into a taxonomy. While taxonomies are important to the human thinking process (i.e. anything that has large teeth is potentially dangerous regardless of how it looks) so that we can consider like actions (running away). The encoding of the decision block for the 'running away' action is a key problem of process management as well as for artificial intelligence or machine learning. LISP and PROLOG for example allow you to encode those conditions in decision trees, but the recognition of what other related conceptual elements in our perception (of the real-world state space) might coincide to influence a decision (there is a strong fence between the teeth and me=zoo=I am safe) has been the unsolved problem.

It is assumed that the human and animal brain does not employ Boolean IF-THEN-ELSE logic to come to decisions. A brain uses a neural network that groups neurons into clusters to map perceptions to existing knowledge patterns in our brain. Certain areas of the brain are predisposed by means of their physical nerve connections to deal with certain perception functions such as sight and sound. Other cluster maps are purely trained and can take on any function. It is sometimes proposed that human decision making process is purely emotional. Humans seem decide based on previously experienced emotions in relationship to current patterns. Rational YES/NO decisions are apparently limited in their consideration of the true complexity of the real world.

The development target for the UTE was: How can we utilize such directly trained experience where actions are mapped to concepts (transductive training) in a real-time computing environment? The technical function of the initial training process and the continued learning during processing is called Activity Mining in difference to Data Mining or Knowledge Engineering as used today.

A human brain is motivated to learn by the feelings of the body and the requirement to fulfill the human needs of food, shelter and replication. It was therefore logical that the UTE software system has to be able to see itself and it has to have some core patterns predefined and described by UTE users (like genetic predisposition and reflexes in a human) and it has to learn by observing people who teach how to react to a certain pattern cluster in its storage.

The UTE software does not attempt to model emotions, but it uses large clusters of decisions patterns to come to conclusions from repeated perception of like patterns. As it learns from more than one UTE user, it is likely that a common emotional decision element is also captured in the Activity Mining. It captures however how a role-group of people generally and usually 'feel about this decision'.

It is possible with the UTE to model the real world by pure information pattern capture. This is for example used in the UTE in document classification to distinguish between different document classes without coding rules. Such captured concept patterns are unique but abstract and their inner meaning cannot be analyzed and reused and the decision-making process cannot be audited as is required by law. Therefore, business concepts can be defined by analysts (UTE users) and made available to the business users from central pattern storage (concept repository) based on their authorization. While the UTA does not require a logical understanding of the learned decision pattern, the human operator has this requirement and thus the structure of the real world has to be encoded into descriptive concept patterns or DCPs that make sense to a human.

The knowledge capturing or training process mirrors the human brain by observing a human as it interacts with the concepts defined. To enable the learning process in real-time the UTA component is given a scope of observation (look only at these concept instances). Any number of concepts is grouped into a cluster of items, for example a business case. The user then populates the concepts with data values (instantiating them) and then performs various actions on these items. The knowledge gathered in real-time is now encoded in a cluster of knowledge patterns that hold the information as to which pattern of information in the cluster is cause for a certain action. The process is not a predetermined sequence of instructions but a decision tree of possible actions to related knowledge pattern maps.

The key distinction of this system to the current state-of-the-art is the real-time dynamics that produces flexibility completely unknown to date.

The UTE system is a system that can learn from human interaction in a very human way. It is less error prone than a human once trained, but it is not perfect in its execution. In real life there is no perfection and as a consequence, the UTE system provides the means to deal with special cases not as special but as something normal. As in real life, the exception confirms the rule.

Rather than creating or inferring a rule-based fact and belief system as in state-of-the-art AI agent systems, the UTE uses object-oriented concepts as existent in the base repository system to describe the concepts on which the UTA are later trained. In a state-of-the-art Java or C++ execution environment where all state-space data are encoded into execution binaries and some stored in database tables, the transductive agent would have to receive all data-changing events from the state-space (internal structures) and all user actions (methods) on the state-space, and then be able to logically relate these to the programmed structure of the program source code and the relational database definitions. In such systems, actions are specified in terms of defined or induced abstract pre-condition rules that must hold before they can be executed as well as the effects that these actions produce.

The definition of what represents an agent is not exact and employs broad interpretation in the scientific community. Also 'active objects' that perform actions based on their internal logic, are influenced by events, and send events to other objects and possess an execution thread (run as a program rather than being manipulated by another program) can also be considered as agents. Based on that perspective, any Object-Oriented program module might be considered as an agent.

In difference to state-of-the-art agents, the UTA does not work with rule-encoded beliefs linked to apparent facts by knowledge engineers but uses explicit problem-solving decision patterns learned from multiple user's repeated experience, thus considered to be 'justified belief.' Justified belief is much cheaper to acquire and use than abstract rule-based expertise. The only uncertainty that the agent has to deal with is how high the probability is that a decision pattern is applicable at a point in time in a given state-space, given all the possible actions, as well as their effects and the applicability to the goal.

The analysis of business, operational or plant processes by 'expert knoweldge engineers' results in a rigid planning model by means of a simplistic step-by-step flowchart with or without multiple logical branches and joining decision blocks. Step-by-step process flows are inherently unable to deal with the random events of daily plant operations or typical business life. State-of-the-art learning agents use post-process data-mining techniques to infer abstract business rules from past activities to create for example partial-order plans using a least-commitment strategy.

The UTE does NOT describe applications and processes by means of programs (characterized as writing a code language such as C++ or Java and then compile, trans-code, cross-compile or interpret the logic into callable program modules or components) nor does it assemble pre-coded software components to create business applications or plant process control or automation applications as a sequential step-by-step procedures, whether in XML, source code, machine language, relational data-base tables or encoded into expert systems by means of defined or inferred rules, but uses unique bitmap clusters.

The UTE does not represent a multi-tiered and multi-agent system in state-of-the-art Artificial Intelligence where different agent function is defined by explicitly assigning rules or programs over the network to an agent. In the UTE the training and execution is always local and no measurement, tuning or training data collection can be but does not have to be transferred over the network for centralized processing. The real-time performance in a distributed system is achieved by caching all DCPs and productive instances from pattern storage in UTE random access memory on the learning agnets node. This applies to all patterns from all nodes (servers) of the system. The caching process uses in particular the Object-Oriented transactional mechanism as described in U.S. Pat. No. 6,848,109 to ensure integrity of pattern definition versions as well as production data.

After the transductive training has been performed, only complete binary decision patterns are transmitted over the network, which are functionally meaningless until another agent can map those patterns to the concepts in his control domain. The training received from the users for the state-space is not basic optimization information but represents collected decision knowledge for the most probable user activity for a current state-space pattern.

State-of-the-art systems for machine automation, robot control and business processes do not allow the analysis and definition information to be modified in a productive environment because of the inability to manage changes and the potentially disastrous errors caused by incompatible programs or interfaces. This problem appears with programs as much as with rule-, or neural-net-based expert systems that learn posthumously from collected data. The UTE provides a solution by enabling error and exception handling with correction activities for machine functions and business processes rather than enforcing error-free processing. Rule languages—such as PQL—are only used to define safety or regulation driven limits.

The innovative and unique functionality of the described invention is summarized as follows:

A method for training a system (in this patent: UTE) characterized in describing real-world items such as but not limited to people, machines, robots, goods, tools, materials, documents and users by means of abstract concept and relationship models from which unique instance patterns are derived in such a manner that multiple transductive training agents in a distributed system can be assigned to real-world user roles so that the agents are individually trained by user role action (Activity Mining) to discover repeating decision patterns in an open-world state-space model of machine or robot activity, operational plans, or business cases and centrally storing the discovered decision patterns for immediate real-time reuse by other agents through cluster similarity without needing predetermined assignment of training, process slices, operational steps, logic rules or other knowledge to a particular agent.

A method further characterized in that all concept, template and instance patterns consisting of attributes, relationships, concept states and transitions, event handling and internal actions are stored in global pattern storage accessible by a unique GUID; that data patterns are descriptive binary data structures that are used to model and later contain the business item attributes; that presentation patterns are used to describe the creation of views and documents; that template patterns are created by means of relationship definitions and default data item values; that template patterns are instantiated for production pattern instances; and that knowledge patterns are trained collections of relevant attributes that describe the state conditions for actions or goal-fulfilling activity patterns.

A method further characterized by the innovation to state-of-the-art software programs that concepts describing the real world are not encoded into program code such as C++, Java or similar and permanently stored by means of serializing internal data into data base tables. The UTE software uses a structured bitmap pattern to describe concepts and simply moves the binary bitmap pattern from the internal memory of computer to pattern storage. A global unique identifier (GUID) is used to uniquely identify each pattern and each new version or variant of a pattern. For use of those patterns in a distributed computer network they are binary copied as proxies to other UTE patterns storage nodes.

A method further characterized in that security is not achieved as an additional layer using outer-shell protection but as an integral part of the UTE where user and agent authentication and authorization are part of the concept pattern definitions and users, agents, tools or external services acting on a pattern have to be authorized by role and policy definitions and each action requires a role authorization and each instance requires an access policy, and all patterns are stored to disk and transported through the network in encrypted format and all communication nodes are authorized through exchanging digitally signed authorization tickets and security compliance can be audited through archiving the complete executed operational business process instance patterns signed with a digital signature.

A method further characterized in that a UTE user authorized by means of a business role to act on certain concepts and a business policy defining the authority to perform those actions on certain productive instance patterns, defines which concepts have what relationship to an operational activity or a business case, or which functional achievement or business goals are relevant for this operation or business case.

A method further characterized in that the UTE user interface and the transaction kernel are capable of separating which user actions change the state of relevant machine function, operational or business patterns, related to a previously defined case template and can be used for training one or multiple User-Trained Agents (UTA) in sequential, distributed, parallel or hierarchical manner to learn functional, operational or business decisions and processes from real-time user interaction.

A method further characterized in that this user interaction is analyzed by so-called Activity Mining (AM) performed by the User-Trained Agent on any open-world state-space represented by a combination of concept model patterns, concept relationship patterns, machine-operations patterns, robot action patterns, user activity patterns, case patterns, presentation patterns, real-time transaction data patterns and previously trained knowledge patterns and uses Machine-Learning principles to learn and execute in real-time, rather than performing posthumous data-mining and subsequent knowledge engineering on recorded and summarized data base extracts.

A method further characterized in that each UTA is given an open-world state-space to monitor, identified by a root pattern that references a scope of different patterns to analyze for training events, where the UTA collects real-time training from user interaction and UTE external events and analyzes which attributes of a concept have which relevance for a knowledge pattern that executes local actions within a state-space instances, or executes all global actions in an implicit sequence created by decision patterns, or automatically creates new activity patterns in reaction to repeated previously unknown external events.

A method further characterized in that a previously trained UTA knowledge pattern might have caused wrong action on a functional, operational, or business pattern instance and where a properly authorized UTE user can delete single or a whole sequence of actions from a decision pattern, and therefore the UTA will not act on the respective pattern but has to request new repeated user training events to retrain the corrected decision patterns for this action on occurrence of a particular template and data pattern.

A method further characterized in that all transductive training is centrally stored in decision patterns and can be a) corrected by an 'add more training' function, b) invalidated in regards to a particular action with a 'remove action training' function, c) suspended by means of a 'suspend training' function, d) reactivated by means of a 'reactivate training' function, e) removed from usage by a 'reset agent' function, and f) assigned to particular agent by assigning a user role with 'use role training' function.

A method further characterized in that all transductive training is centrally stored in decision patterns and can be analysed across all agent training by listing available training data by a) actions performed against a particular concept, b) by concept or template, c) by user role, d) by attribute relevance, e) by time of training, and f) strength and confidence of training.

A method further characterized in that an activity pattern is a cluster map of related concepts, template or instance patterns rooted from a goal definition that causes goal-mismatch events when unknown pattern states are encountered or goal values are not fulfilled, where these events prompt authorized users to perform training on the functional, operational, or business instance patterns by either creating a new activity, or by add-on training to existing knowledge patterns within that activity pattern.

A method further characterized in that the UTE is capable of highlighting unauthorized, illegal or regulation violating functional, operational, or business activity by means of recognizing exceptions (unknown activities in the current state-space pattern) to the usual processing without defining the necessary rules that describe wrong situations, and enables monitoring machine or robot activity, as well as business compliance without logging individual user actions by identifying activity outside the range of previously trained actions taken on a given case or plan pattern.

A method further characterized in that in difference to a typical key-sequential or relational data base where concepts are defined in table definitions and data-base table records are overwritten when changed, the concept, template and instance patterns contained in the UTE pattern storage are not destroyed or overwritten except requested explicitly, but new versions of these patterns linked to the transaction number of the last change are created, stored to hard-disk and retained based on a management algorithm and defined auditing requirements.

A method further characterized in that decision patterns are not use to induce a rule execution sequences or programs, but all actions performed by users and agents are archived for auditing purposes and a tri-dimensional (3D) representation of existing concept definitions and training in central pattern storage is made available as moving items in a 3D space by means of a 3D virtual wire-frame engine or similar that enables the user to navigate with the mouse through historic state-spaces in the archive or through currently processed state-spaces in real-time and interact with all items in the state-space according to his role authority.

A method further characterized in that it advances the state-of-the-art of BPM systems, multi-agent business process management systems, ECM enterprise content management systems, as well generic workflow systems by employing a three-dimensional representation of the business case (process) and its state-space by means of multiple diagrams such as 3-D VENN diagrams or others, or by aligning various parameters on axis, such as for example process actions on the X-axis, case items on the Y-axis and user roles on the Z-axis, to enable graphical means to present case-state-event dependencies that a two-dimensional BPM process or operational plan flowchart is unable to represent.

A method further characterized in the UTE user can enter goal-defining rules (such as but not limited to PQL or Pattern Query Language) to be executed at a certain meaningful state-space pattern, which create, instantiate, navigate, search, modify or delete concepts, templates or instances and while PQL statements are stored in source code for readability and auditability they are converted to UTE pattern structures and reference concepts, templates and instances and are stored, versioned, deployed and archived in the same manner as all the other patterns in the UTE.

A method further characterized in that the UTE system structure and components—including network layouts and software components—itself is defined and controlled by concept-, template- and instance-patterns, which means an UTA can be trained to create, change and optimize or tune the system definitions, operations and processes of the UTE operating environment itself and not only the operations and business applications that have been trained to run in the UTE.

A method further characterized in that the users, whose actions are monitored by UTE, have roles that identify the state-space of concepts that they are authorized to act on and that role also defines the decision-pattern knowledge-space that the Activity Mining on their actions creates and it defines the scope of recommendations that they receive from the UTA that monitors their state-space for decision patterns.

A method further characterized in that the UTE receives events from goal-defining rules stored in the UTE repository, or receives events from message or program interfaces that connect to outside systems by any networking means and with or without imbedded content (such as documents, data fields, audio or video in any format) and that this event is acted upon by the UTE by prompting users to identify the functional, operational, or business case related meaning (not just simple classification of the content) of the data patterns contained in these events and that an UTA creates decision patterns from the actions of the user as to the abstract meaning of these events and their imbedded content in relationship to the operational or business concept instances in the UTE repository.

A method further characterized in that the user roles defined in the UTE contain also privilege information that defines how that user role can interact with the UTA training and execution functions. A role a) has to follow the suggested actions in the decision patterns, or role b) can either follow the recommended actions or perform another action but it is ignored by the Activity Mining, or role c) can either follow the recommended actions or perform another action and that action has to be authorized by a higher authority role to create new knowledge patterns, or role d) can either follow the recommended actions or perform another action and that action immediately creates new decision patterns, or role e) can delete the decision pattern that causes a recommendation and thus invalidate previous training.

A method further characterized in that the UTA uses free-form information items (represented for example as stickers, dialogs, memos, or free text email) in the stochastic state-space of the operational process or business case to communicate with the users of the UTE system and also uses these information items put by users into the state-space to train the UTA decision patterns, where such items can contain questions, related answers or action guidance created by other UTAs in the UTE system.

A method further characterized in that spoken text messages in audio format received by the UTE by any means in any language, such as phone calls (either converted to electronic by voice recognition or analyzed as speech patterns directly) or other audio recordings are used to identify concepts in the repository and that semantic language analysis allows to navigate to possible existing instances of such concepts by means of identifying the search parameters though the semantic analysis in the text where the claim is related not to the principal voice analysis but to the direct use of the analyzed text mapped to the concepts in patterns storage by means of decision patterns.

A method further characterized in that multiple instances of the UTE repository can be started of which each one represents an application domain with all its system nodes and gateway nodes can be defined so that the different application domains can communicate through the OO-transaction bus and exchange concepts, templates and instances and update each other as to the most recent versions of the same.

A method further characterized in that a worldwide central UTE Meta-Repository is accessible through the Internet and known to all UTE users where the users can download DCPs and templates for representation of real world items such as machines, robots, as well as abstract business entities and where those users can upload their own concepts and templates to the UTE Meta-Repository to be shared with other UTE users. UTE users can also download UTA trained decision-pattern knowledge that has been uploaded by other UTE users that describe decision processes and virtual plans related to real-world items such as machines, robots, physical or virtual documents, generic media content as well as abstract business entities.

A method further characterized in that a worldwide central UTE coordination service is used through the internet that allows UTE users to search the repositories of other UTE users by means of classification of patterns for concepts, templates and UTA trained knowledge while protecting the anonymity of involved parties if that is requested. This service would connect all UTE repositories used into a single globally usable knowledge repository.

A method further characterized in that the bitmap-clusters in UTE pattern storage contain the complete representation of the application functionality and the real business data and can be copied and installed in another location and on another supported operating system by a simple file-copy operation without the need for exporting and importing the UTE pattern storage.

A method further characterized in that the UTE can provide the platform for SOA Service Oriented Architectures and can be interfaced to other IT systems using the principles of SOA in which the structure and message format for communication are usually rigidly predefined using XML principles. The distinctive innovation that the UTE offers to SOA is the ability to classify incoming communication messages regardless of their bit- or byte-wise format and map these to an UTE transaction, process or case by means of interactive training by an operator.

A method further characterized in that the UTE is applied in cooperation with a navigation system for road vehicles, naval vessels or airplanes. The distinctive innovation is that future route decisions are weighted by past decisions of the user (driver) not to follow the route directions given by the navigation system. If the user/driver turns off a given route then the UTE program analyses the information patterns of time, location, map structure, weather, traffic or any other relevant information pattern received and creates a recommendation decision that overrules the basic route calculation presented to the user. A goal-based decision pattern can also be created by the UTE, where decision trees are valued with past goal achievement of shortest time, route or other criteria.

A method further characterized in that the UTE is applied in cooperation with a navigation system for road vehicles, naval vessels or airplanes and the route decisions taken by various drivers in their vehicles are stored in a central knowledge repository and reused by other drivers that have not taken that same route before. A key distinction to the state-of-art is that the route selection of the UTE is based on driver decisions related to the time of day, weather and traffic patterns and other incidental information patterns. Different driver types can choose different routes and thus classified into driver groups who make different driving choices.

A method further characterized in that the UTE is used as a modeling platform or a gaming platform in which the action properties of the various abstract entities in the game or model are trained by user interaction with the concepts via the monitor and keyboard or a gaming console rather than created by rules or random functions.

Although the invention is illustrated and described herein as embodied in a method for training a system to specifically react on a specific input, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings.

In FIG. 1A the UTE system patterns are drawn.

DETAILED DESCRIPTION OF THE PREFERRED EMBODIMENTS

Figure 1:
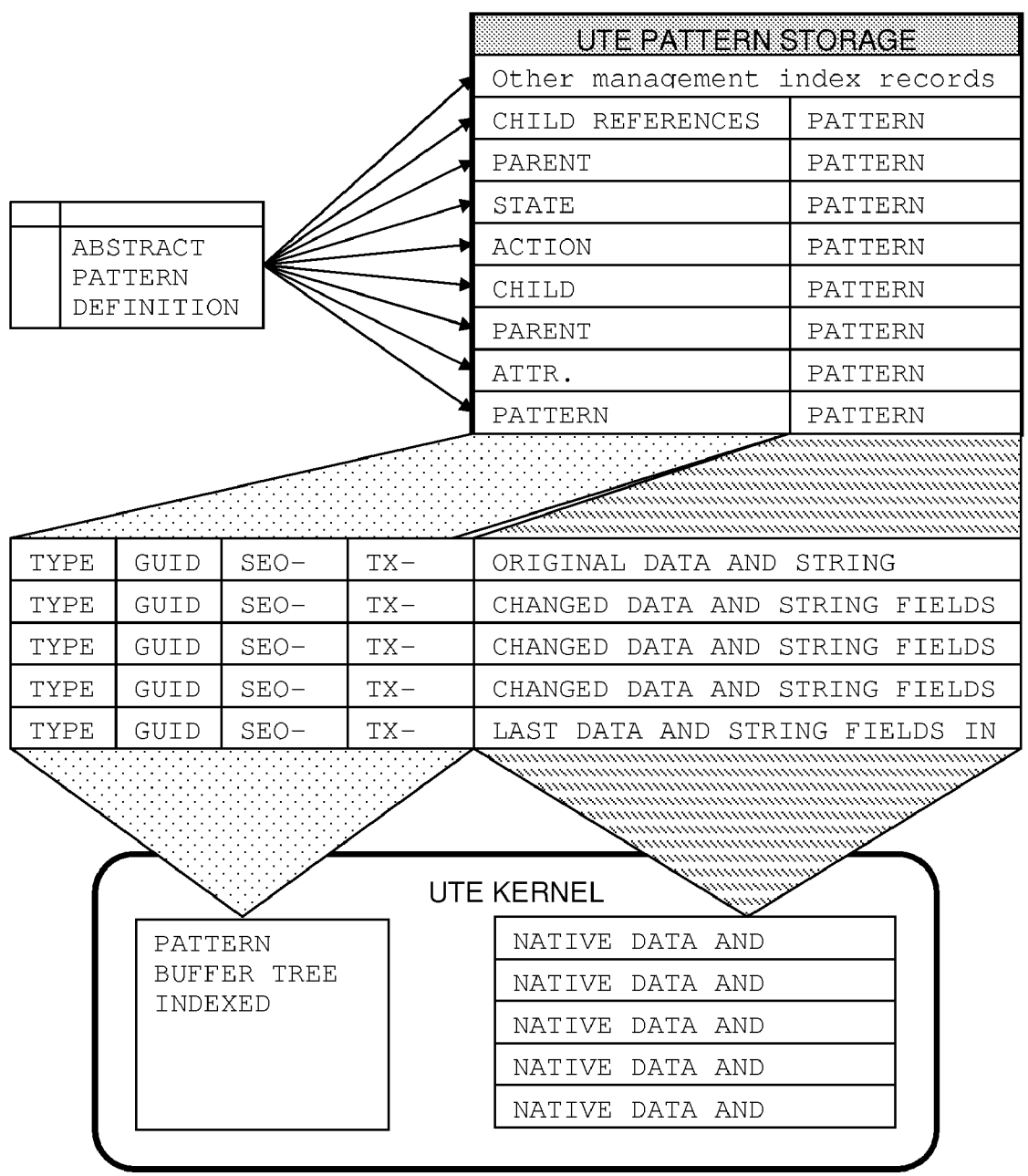
FIG. 1 shows in a diagram a UTE binary pattern format and storage.

As the UTE system describes concepts in bitmap patterns that are stored in a proprietary binary data format in a global pattern storage (not in XML, not in source code, not in a machine language such as a Java binary) and identically executed as-is by the UTE transactional kernel code without transcoding or compilation on every operating system that the kernel runs on. The patterns as shown in FIG. 1 are stored to disk in a simple key-sequential database in multiple record types and held in the UTE cache, as well as memory in the same format.

The purpose and functionality of the UTE binary format is to enable the system to store pattern descriptions in a flexible, efficient and well performing manner. This special format is required because it is necessary to not only provide access to the data content of the storage but also access to the concept patterns that describe the pattern model. According to FIG. 1 there are 8 (eight) core tables and 7 (seven) additional index tables that all contain pattern information in a proprietary format.

Each pattern description is contained in 8 (eight) record types and most are used multiple times to represent repeating elements of the pattern such as attributes or references.

Each record is indexed with four key values:

TYPE: To be able to search, read and write elements efficiently they are keyed with a type elements so that access is immediate.

GUID: The GUID is the Global Unified Identifier that is system-wide unique and contains the information on which node the object resides. If a proxy of this object is copied to another node of the system the owning node is identified immediately.

Sequence number: For presentation, efficiency and repeatable pattern matching purposes, the sequence of identical records is retained.

Transaction TX-ID: To identify the versions of patterns the transaction ID of the transaction that wrote the pattern element is stored. This enables to identify all elements of one transaction.

The UTE kernels in the system manage pattern access on a record level. The kernel only searches, reads and writes records as needed. Therefore, it does not matter how big the actual pattern is, as the UTE kernel will only read the necessary elements. The pattern record is moved to memory and stored there as-is without conversion. If the pattern has been requested by another node in the UTE system, then the record is passed via the UTE system network to the other node, and stored there on disk as a proxy of the actual pattern. As long as pattern does not change, the remote node working with the pattern will not reload the pattern again. This minimizes network traffic and allows offline operation of a remote node. When the remote node loads the pattern into memory to work with it, it sets a notify flag in the owning node, to receive pattern change events via the network.

The pattern definition is managed in different records on disk and in memory to increase performance on read/write.

Once a pattern has been stored as a proxy on a node then it is available in read only mode on that node. If the remote user or application wants to change the pattern it can do so by either opening a distributed transaction and locking changes until all changes are completed. This mechanism uses the distributed OO-transaction mechanism as described in the U.S. Pat. No. 6,848,109 to ensure data integrity across all network nodes and all entities of a transaction.

To protect the system from being accesses by unauthorized users or malicious programs (viruses, worms or similar) all records are stored in encrypted format on disk and sent in encrypted format through the network. The encryption key is private to the owning node or to the complete domain. This means that access to the pattern storage is not possible from the outside as key values cannot be read and record content can not be decoded except by the authenticated program or owner from within the system with the correct role and policy.

As the UTE system does not use programming to describe its concepts, which in Java, C++ or C# is called CLASS, but a definition paradigm, the core functionality is encoded in META-CONCEPTS. This will be more explained in FIG. 1A. The UTE concept storage represents a full virtual meta-data repository. A CONCEPT is less complex than a coded program but by means of state engines and rules all application functions can be defined. CONCEPTS and TEMPLATES inherit features of parent CONCEPTS. CONCEPTS and TEMPLATES utilize a version chain that enables fully featured change management inherent to the UTE system.

According to FIG. 1A to model the real world and user interaction for the UTE a so called CONCEPT is used that is stored in UTE disk memory as a electronic bit-map pattern. The UTE exposes its own C++ programmed pattern functionality via a so-called meta-concept definition. It describes the principal functionality of a pattern from where all patterns in the system are derived. All patterns defined inherit the descriptive capability via the meta-concept. This enables UTE system developers to enhance the UTE pattern capability without making the existing patterns obsolete. The meta-concept describes the general functional meaning—executed in the UTE transactional kernel—of the records in the UTE pattern disk storage to the outside world. All system functions that create, display, and edit patterns use this definition.

A concept is an abstract model of a real world item. This can represent physical objects such as documents, items in a warehouse, computer systems and components, manufacturing machines with their components and moving parts, as well as robotic entities. It describes all necessary features of that kind of item via:

The attributes and attribute types, attribute properties and their possible value ranges, access privileges and policies, State definitions, state pre- and post-constraints, state transitions, transition change events, state changing event listeners, Action definitions, action mapping to system internal functions, state changes, and Child and parent relationship definitions that describe one to many references to other patterns that describe the real-world use of the concept, such as 'is-a-part-of'.

It is possible—similar to object-oriented programming—to inherit features from another concept. This has the purpose of simplifying the definition of repeating patterns and enabling global pattern definition changes. Inheritance is a real-time function, which means that if a concept is changed in pattern storage that all templates and instances derived from this concept are immediately able to use the new feature. This is a key-difference to all programming languages because there is no intermediate compilation and deployment step to achieve that.

To enable the use of concepts in many different ways, the UTE user can create a template based on a concept definition. The template inherits all features of the concept and can overwrite some of its features. In difference to the concept, a template can define instantiation defaults for attributes and references and thus be used to build libraries of pre-configured concepts in complex relationship structures. A template always retains a backward pointer to the concept it was derived from and is updated when that is changed.

Instance patterns are derived from templates and contain all its default values. Instantiation is performed on an owning UTE kernel node inside its pattern storage and the node location becomes part of the instance GUID. A instance always retains a backward pointer to its template and is updated when the template changes.

By means of the UTE record structure all previous versions of concept, template and instance patterns are retained. A new version of a pattern goes through development, test and production states and thus enables a fully featured change management workflow. Versions have a start and end validity date that the UTE kernel uses to define the current version that is productive.

Figure 1B:
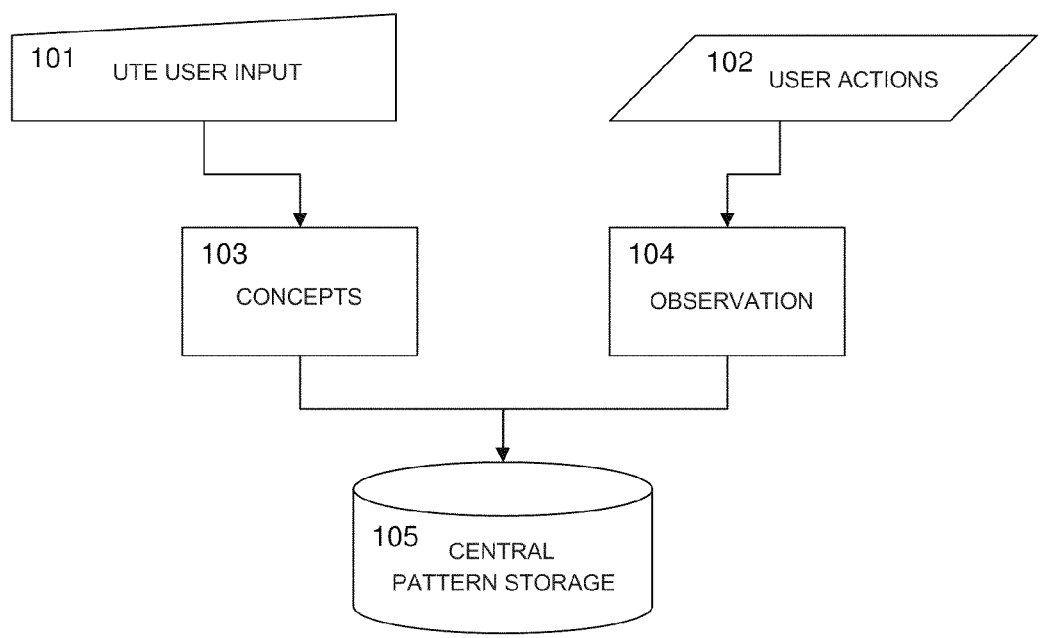
In FIG. 1B a user interactive input and data capture is drawn.

In FIG. 1B is shown how human behavior in the real world can be mapped into decision patterns relating to physical objects without analysis and rule programming using the UTE.

In short words, an UTE user input 101 in natural language or drawings creates the business models as concepts 103 that are stored in the central pattern storage 105 without using typical programming paradigms or using a model-to-code conversion. Human brain like mechanisms of pattern recognition are used to create clusters of concepts and patterns that make sense as they reappear frequently. Alternatively or in addition data, content or user actions 102 are captured to create concept clusters from observation 104 and stored in the central pattern storage 105.

Figure 2:
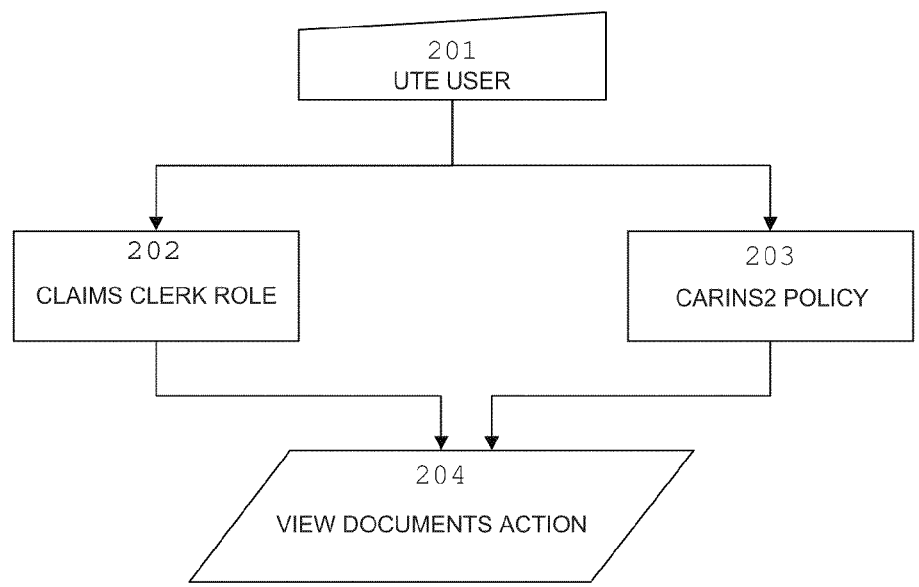
FIG. 2 shows the user authorization for training and execution of the system.

FIG. 2 explains the user authorization for training and execution. The authorization is based on the well-known principle of ROLE and POLICY. It is essential that the role/policy authorization is an integral part of the UTE system. If a user is not authorized to work in such an open environment its business use would not be practical. Additionally it is essential that the workspace of the user is defined. This definition is linked to the user ROLE.

All UTE users are authorized by means of a ROLE and a POLICY. Roles define the authority to execute certain methods and policies define on which patterns these are allowed to be performed. These are integrated definitions within pattern storage because the user training depends on recognizing the user role. As this system is also productive, it is essential that every access is authorized.

For example an UTE User 201 with role 202: claims-clerk and with Policy 203: CARINS2 is allowed in 204 the action viewing documents (viewdoc) and its workspace is defined as car insurance, data instance (Carins2).

Additionally, it is required to define the user's authority in relationship to the training as not all users have the same right perform training or correct knowledge patterns.

Figure 3:
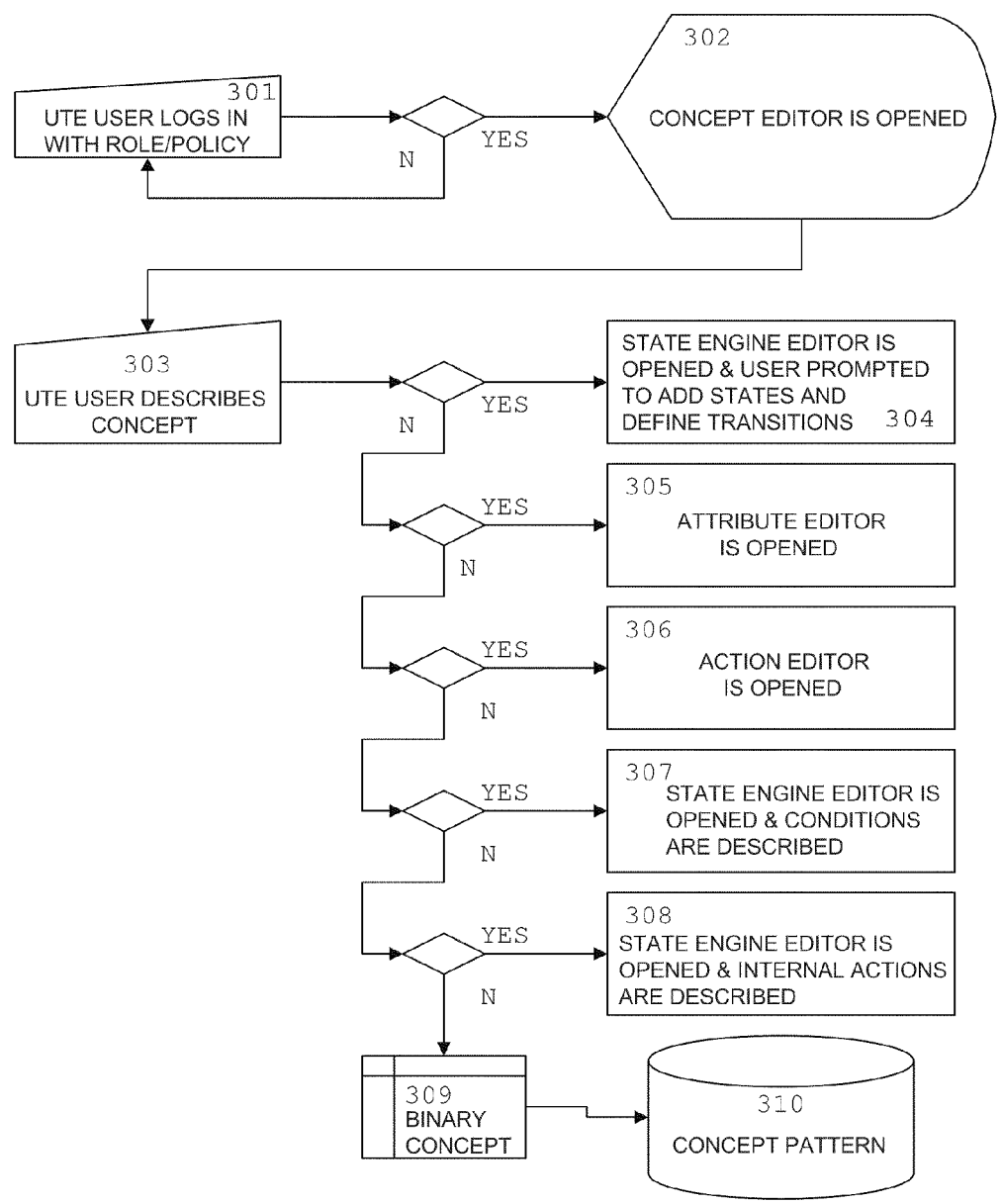
In FIG. 3 a flowchart is drawn explaining an interactive creation of business concepts.

In FIG. 3 a flowchart is drawn explaining the interactive creation of business concepts. A UTE user is defined and authorized to create concepts. Using a concept editor the features of a concept can be described in an interactive manner using selection of features such as descriptions, attributes and their value ranges and presentation, concept states and their transitions, state and state-transition pre- and post-constraints on attributes, internal actions that change attributes, rules to be executed on actions, events to be sent on state transitions, external events to listen to the internal actions to be taken, and storage management attributes of the concept instance.

In 301 an UTE user logs in with its role/policy. The authorization is then verified, and if YES in 302 in the UTE user interface a concept editor is opened and feature choices for concept creation are listed. In 303 the UTE user describes the concept. If the concept use a state engine, in 304 the state engine editor is opened and the user is prompted to add states and transition definitions. If the concept uses attributes, in 305 the attribute editor is opened and the display properties and value ranges are described. If the concept uses internal actions, in 306 the action editor is opened and the function of action is described. If the concept create events, in 307 the state engine editor is opened and the conditions for event to be sent are described. If the concept reacts to events, in 308 the state engine editor is opened and the internal actions that the event causes are described. Finally, the binary concept 309 is stored as a concept pattern 310 using GUID's.

Figure 4:
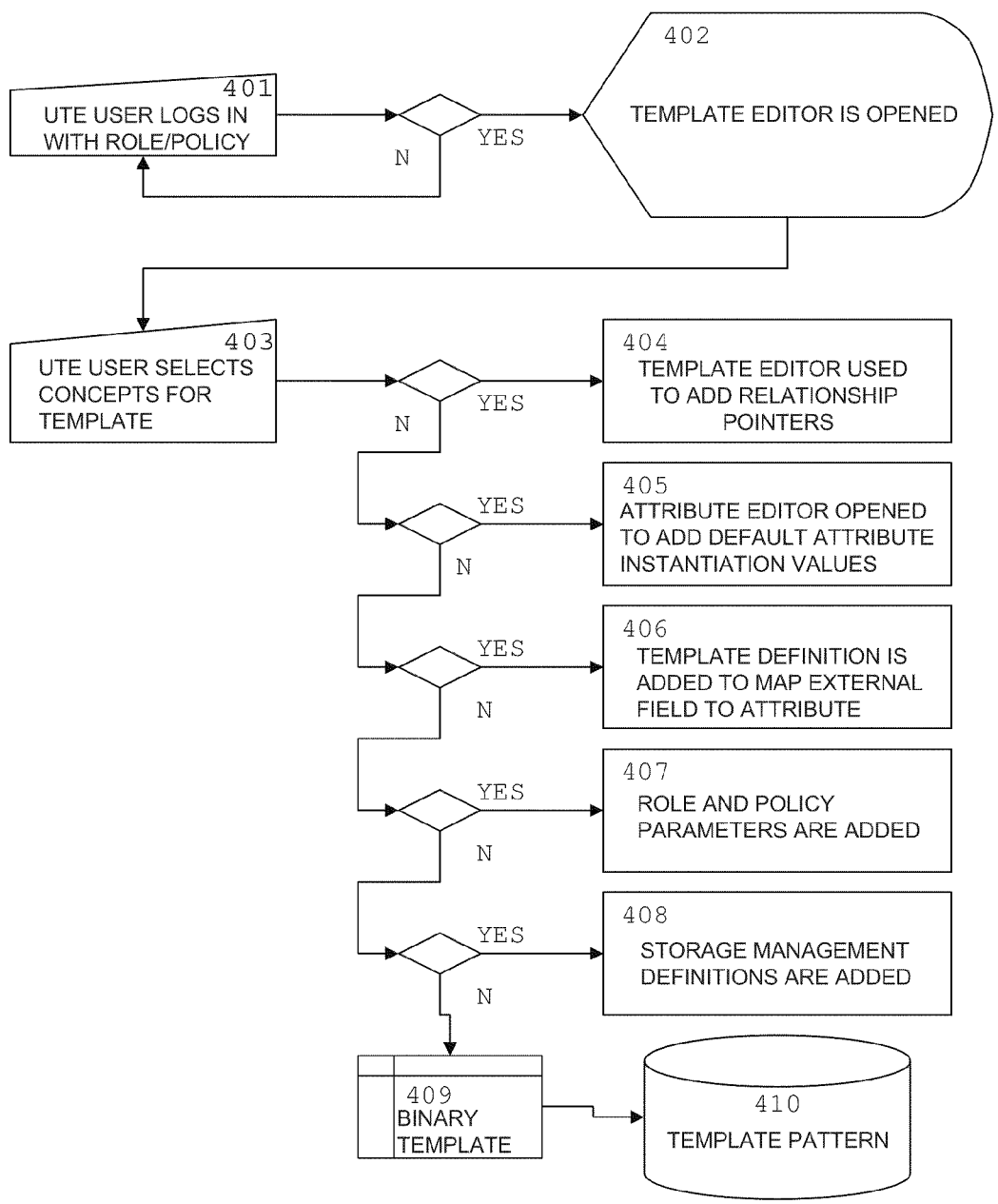
In FIG. 4 a flowchart is drawn explaining the definition of business case template patterns.

In FIG. 4 a flowchart is drawn explaining the definition of business case template patterns. A UTE user must be authorized to access concepts and to create template patterns. Using a template editor, multiple concepts can be assembled in an interactive manner to have certain default values on instantiation and to have a predefined relationship to other concepts. Templates patterns contain default values for later instantiation. The UTE user can define which UTE user roles are authorized to work with the templates and what policy the instance that is created from the template are have. Storage management attributes are defined to describe the system locale on which the instance is to be created.

In 401 an UTE user logs in with its role/policy. The authorization is then verified, and if YES in 402 in the UTE user interface a template editor is opened and all concepts that the user is authorized for are listed. In 403 the UTE user selects concepts to be used in template. If the pattern consists of multiple concepts, in 404 the template editor is used to add relationship pointers in template definitions. If the template requires attribute default values, in 405 the attribute editor is opened to add default instantiation values for attributes. If the attributes are to be filled from external data, in 406 the template definition is added to map external field to attribute. If the role policy definitions are different from the concept, in 407 the role and policy parameters are added to only authorize certain users to interact. If the templates to be used are in a certain location, in 408 the storage management definitions are added to allow instantiation of templates in locations. Finally, the binary template 409 is stored as a template pattern 410 using GUID's.

Figure 5:
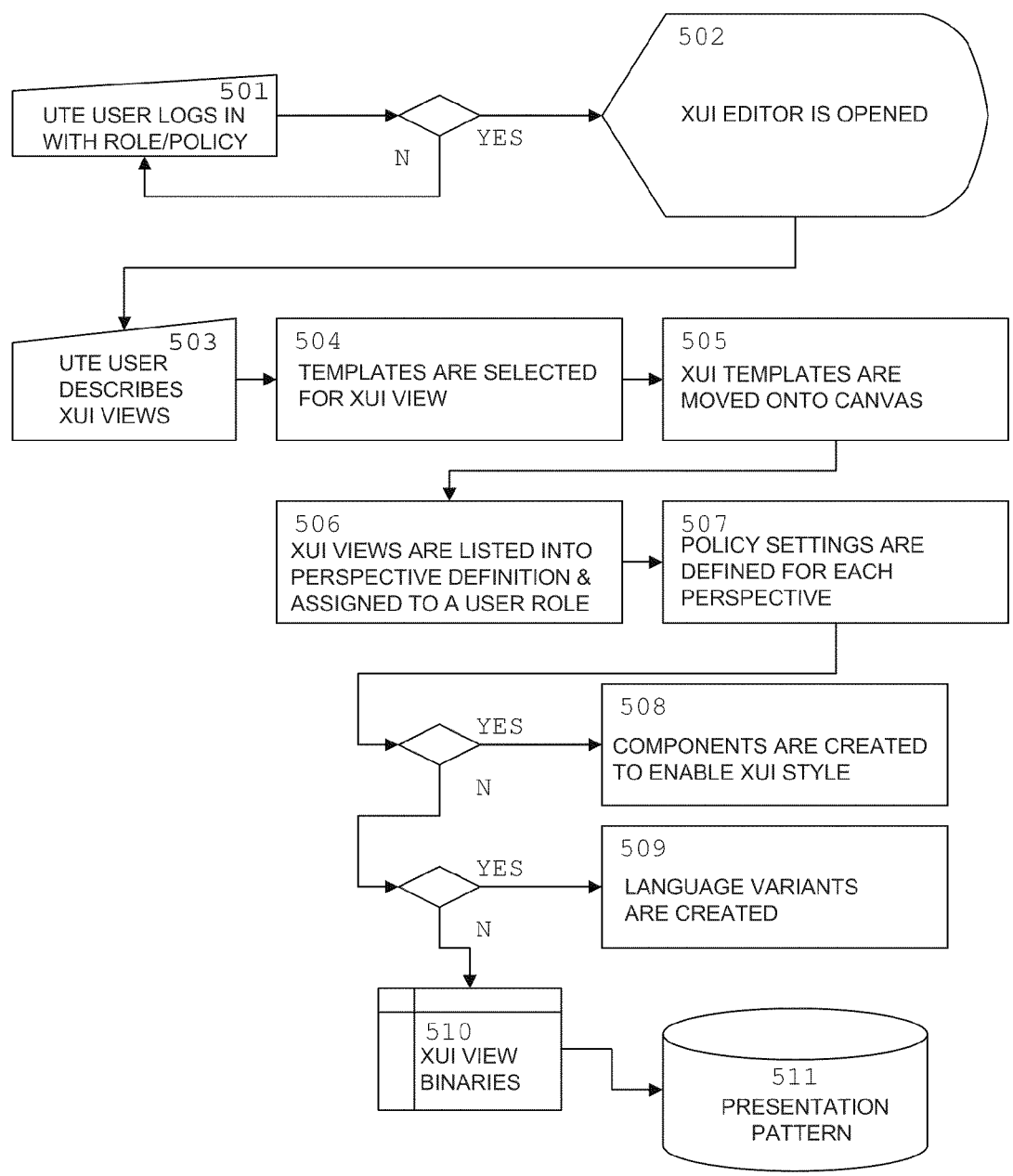
In FIG. 5 a flowchart is drawn explaining the definition of UTE user interactions.

In FIG. 5 a flowchart is drawn explaining the definition of UTE user interactions (XUI). A properly authorized UTE user can define presentation patterns (VIEWS) using an extendable dynamic interface (XUI) that are present concepts, templates and productive instances. The UTE user interface has integrated editing features that enables dynamic adaptation of the presentation for a certain user based on his role and the chosen perspective within the role. The XUI presentation pattern consists of presentation concepts that are assembled into templates and then instantiated for each user that logs into the system. A properly authorized user can change the XUI definitions that he works with.

In 501 an UTE user logs in with its role/policy. The authorization is then verified, and if YES in 502 in the UTE user interface a XUI editor is opened and feature choices for XUI definitions are listed. In 503 the UTE user describes the XUI views. In 504 all templates to be presented in the XUI view are selected and default view controls are set. In 505 the XUI templates are moved onto canvas via drag and drop and presentation relationship and parms are added. In 506 the XUI views are listed into perspectve definition and assigned to a user role. In 507 for each perspective the policy settings are defined. There is no rigid GUI coding, just views. If the views are also used for web presentation in the Portal, in 508 HTML, FLASH or Java components are created to enable the XUI style. If the XUI view content is dynamic and depends on the user language, in 509 language variants of content and map according to language definitions are created. Finally, the xui view binaries 510 are stored as a presentation pattern 511 using GUID's.

Figure 6:
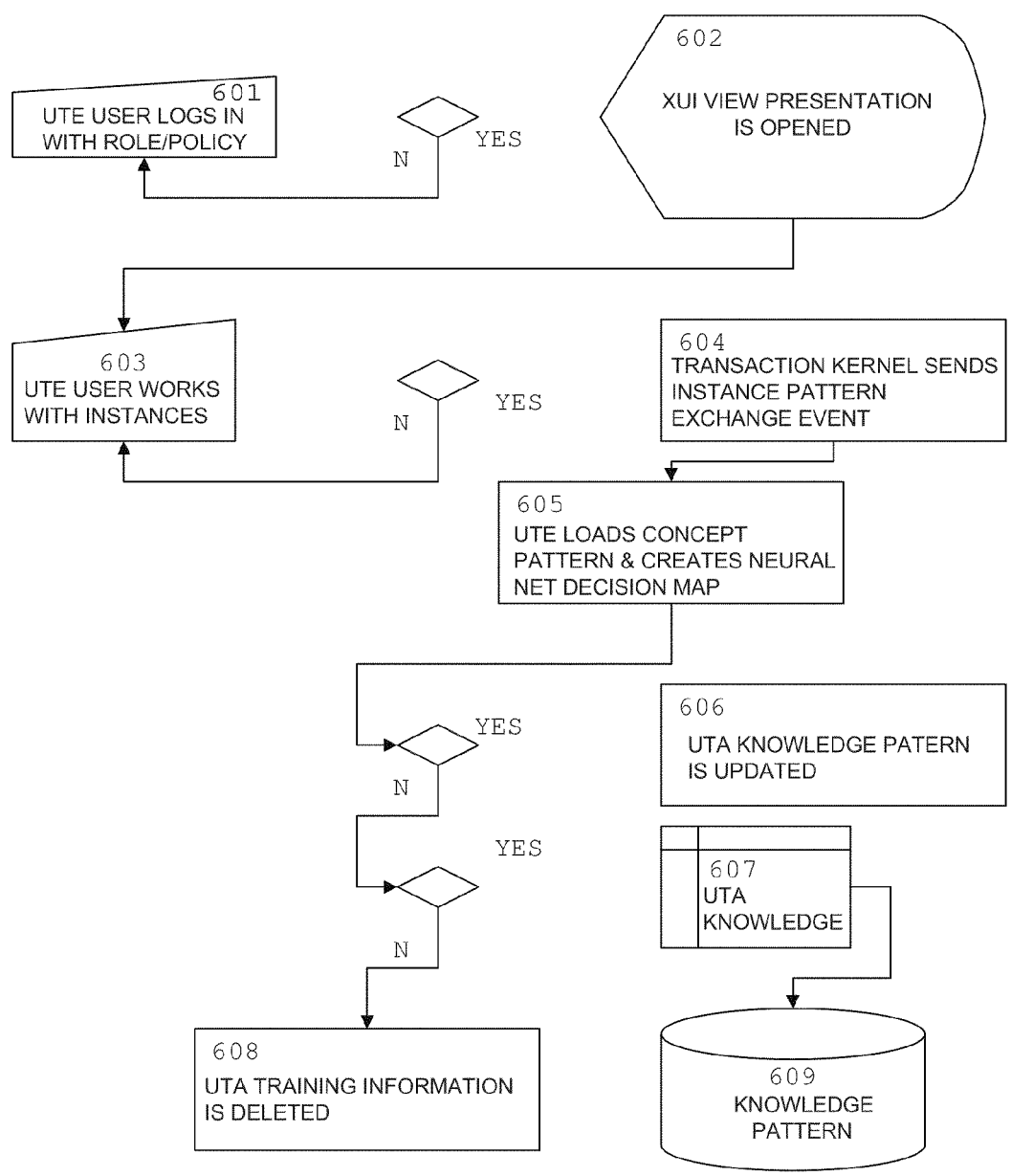
In FIG. 6 a flowchart is drawn explaining the process oriented training of a business case.

In FIG. 6 a flowchart is shown explaining the process oriented training of a business case. A properly authorized UTE user are typically use XUI views to select template patterns related to a business case and instantiate them into the productive UTE environment. XUI is capable to identify with user actions are relevant for the instance patterns and which are not. If the UTE user performs state or data changing actions or calls internal actions, a User-Trained Agent (UTA) that is assigned to the users workspace performs a real-time pattern analysis and stores training information that maps the action to the data patterns and to dynamically loaded concept patterns from pattern storage.

In 601 an UTE user logs in with its role/policy. The authorization is then verified, and if YES in 602 the XUI view presentation is opened and allows the user to access templates and to instantiate a business case. In 603 the UTE user works with instances. If the user XUI action is relevant for the instance, in 604 a transactional kernel sends an instance pattern exchange event to the workspace UTA. In 605 the UTA loads concept pattern from the storage and creates a neural net decision map. If the same action in the same state of pattern happened repeatedly again, in 606 the UTA knowledge pattern is updated with higher probability of pattern-to-action map. If the transaction of the original change event has been completed successfully, the UTA knowledge 607 is stored in a knowledge pattern 609 using GUID's. If NOT, in 608 the UTA training information is deleted from the memory and is not kept in the pattern storage.

In principal, the User-Trained Agent consists of three modules. The Collector is responsible for real-time data acquisition in the state-space. The Trainer filters the essentials from the patterns and creates a decision tree. The Actor uses the decision tree provided by the Trainer to perform real-time actions.

Raw pattern data is gathered by the Collector and made available to the Trainer. The Trainer works asynchronously in its own thread, transforming the raw data into useful knowledge, which is then persisted in the knowledge pattern. When the Actor is called, it takes the information from the knowledge pattern and uses this for the decision process.

Data acquisition is initiated in an UTE kernel that owns the root pattern. If a user performs an action in the scope of the UTA, then the Collector gathers the raw state-space data necessary and hands it over to the Trainer. This raw data consists of information on the activity (its name, parameters, etc.) and the data on the pattern tree that is the target of the method. It is important at this stage to only collect actions performed by the user and not actions that are performed by automated processes. This is ensured using a heuristic that only takes the first method of a transaction and scans it for the typical characteristics of user interactions. This works quite well, but it is desirable that the XUI marks all user-role actions with a special flag.

All data necessary to perform an action are collected and stored. These include the pattern reference of the calling pattern, the method name, and all parameters. Additional processing has to be done for parameters that are pattern references. These may not point to a fixed pattern for all invocations of the method. They may also point to a pattern relative to a given one (either the calling pattern or an pattern defining the setup). For such parameters, not the pattern reference itself is stored but the information necessary to navigate from a given pattern to the parameter pattern.

To find a relative path, a simple but so far very effective heuristic is used.

Recording a relative path: For every navigation step (up or down the pattern hierarchy), the concept and the (visible) name of the target pattern are recorded.

Navigating a relative path: For every navigation step, the concept and the (visible) name of all references in the given direction is compared with the recorded values. If this gives a unique match (either by concept alone, by name alone, or by concept and name) then this match is taken as the next navigation point, otherwise navigation failure is returned.

The main pattern that is acted upon and all its descendants that its references point to (up to an adjustable level) are considered to be potentially important for the decision process. This tree structure and all relevant features of the patterns in it are stored in a sub-structure under the knowledge pattern and sent to the Trainer as part of the raw training data.

The scope of an UTA is defined in one of its attributes. This can be either the parent scope or the sibling scope. In the parent scope, the UTA takes responsibility for all patterns under which it is linked. In the sibling scope, the UTA takes responsibility for all patterns that are its siblings i.e. all patterns that share a parent reference with the UTA.

If the user performs an action with a pattern in the scope of the UTA and training is switched on for this UTA, then the Collector gathers the raw training data from the state-space and feeds that to the Trainer module of that UTA.

If a pattern in the scope of the UTA is modified and acting is switched on for this UTA, then the Collector notifies the Actor module of that UTA of the potential acting possibility.

The Trainer uses the raw data obtained from the Collector to build a decision tree. In order to do this the distances between the samples with respect to several features are taken and then analysed. This setup is designed in a way that makes it easy to add and remove features to the Trainer.

The feature of a tree structure analyses the way in which the input data patterns are linked to each other. This feature assumes a tree structure, so multiply linked patterns are counted as different patterns in this feature. For each node in this tree, the concept or template of the given pattern is taken as the defining quality. Then an algorithm using the Earth Movers Distance is used to compute the effort needed to transform one tree to the other. This effort is then scaled and used as the distance between trees.

The state of each pattern in the input data is recorded in a list. To compare two such lists a matrix of distances between the entries of the list is built. Entries of this matrix are either −1 (the state machines can not be compared, since they are defined in different concepts), 1 (the state machines can be compared, but have a different value), or 0 (the state machines can be compared and have the same value). The matrix distance of this matrix is then returned as feature distance.

The name of each pattern in the input data is recorded in a list. To compare two such lists a matrix of distances between the entries of the list is built. Each entry of this matrix is the Levenshtein distance of the names. The matrix distance of this matrix is then returned as feature distance.

All relevant attributes of all patterns in the input data are recorded in a list. The relevance of an attribute may be influenced by the user. The attribute types (string, int, object) may be selected. A negative or positive list of relative attribute names may also be given. Only the selected attributes are taken into account. To compare two such lists of attributes, a matrix of distances between the entries of the list is built. Each entry of this matrix is either −1 (if the names of the attributes are not the same or if the types of the attributes are not comparable e.g. Int and String), or the type-specific distance for the attributes (Levenshtein distance for String, a scaled difference for numerical values, and a trivial metric which is either 0 or 1 for the others). The matrix distance of this matrix is then returned as feature distance.

An improvement of this technique is a pre-computation step, the relevance of the attributes to distinguish between actions is computed, and translated into a weight for the given attribute. The individual distances are then weighted according to this weight in the computation of the matrix distance.

All relevant attributes of all patterns in the input data are recorded in a list. The relevance of an attribute may be influenced by the user. The attribute types (String, Int, Object) may be selected. A negative or positive list of relative attribute names may also be given. Only the selected attributes are taken into account. To compare two such lists of attributes, a matrix of distances between the entries of the list is built. Each entry of this matrix is either −1 (if the types of the attributes are not comparable e.g. Int and String), or the type-specific distance for the attributes (Levenshtein distance for String, a scaled difference for numerical values, and a trivial metric which is either 0 or 1 for the others). The matrix distance of this matrix is then returned as feature distance.

This feature takes a relatively long time to compute. Another implementation option for this feature is a Bayes classifier.

The UTA history of the pattern is checked, and a weighted distance of the performed actions is computed. Weights are decreased by a geometric scale from the newest entry to the oldest.

A new kind of monothetic clustering is used to build the decision tree in a recursive way. In the following, a description of this algorithm is given.

Input for this algorithm is a selection of raw training data from the real-time state-space.

For each active feature, a clustering algorithm is performed (this may use a different clustering algorithm for each feature, but for the moment all features are clustered using single linkage hierarchical clustering. Each clustering is then scored using three parameters.

The cluster stress, measuring the effort needed to keep points in one cluster together and to keep different clusters apart.

The purity, measuring the number of different user actions that are merged together in one cluster (ideally there would only be one user action per cluster).

The cluster height, measuring the minimum of the variational distance between two clusters.

The feature whose clustering gives the best score is then used to separate the selection of input data. For each such cluster one of three possible actions are performed.

If the cluster is too small (determined by the Minimal Cluster Threshold attribute of the UTA), then it is ignored.

If the cluster is pure enough (determined by the Purity Threshold attribute of the UTA), then it is used as a final node of the decision tree.

Else, the elements of the cluster are used as the new selection and the decision tree builder is called with this selection.

The result of this algorithm is the decision tree. At every internal node of the decision tree, the deciding feature is stored. At every leaf node, one or more data clusters are stored.

Initiating the Actor: Every time a transaction is committed and a pattern is modified, the UTE kernel checks if this modified pattern is in the scope of any UTA with an active Actor module. The pattern, together with a list of all such UTAs is handed over to the Actor module. The Actor module then starts the two step process of determining and performing the necessary actions. During that time, the Actor module locks the modified pattern so that the same pattern is not acted upon by the same UTA from two different threads.

During the decision phase, the Actor module matches the input pattern with the decision trees of all UTAs in the given list.

At each internal node of the decision tree, the variational feature distances of the input pattern to all data clusters in all relevant leaf nodes are computed. The closest distance is then taken and the corresponding cluster is accepted if the distance is under a given threshold (adjustable by the Feature Distance Threshold attribute of the UTA). If the cluster is not accepted, then no decision is reached. Otherwise, the branch of the decision tree leading to the accepted cluster is followed by one step.

This is performed until a leave node has been found, and the corresponding action is returned. In addition, a decision confidence is computed, which is computed as the product of the confidence probabilities at each step of the decision tree.

The Actor module then checks if any UTA has reached a conclusion and if so, the UTA with the best decision confidence proceeds to the Acting phase.

In the acting phase, the UTA performs the action corresponding to the cluster that had been found in the decision phase. To do this, first all necessary parameters have to be translated, in particular relative pattern reference attributes have to be resolved using the heuristic described in Section.

The action is then called in the UTE kernel unless it is a user interface method or an Activity. In these cases, only a possible suggestion is logged in the feedback pattern (see Section.

If existent, a feedback pattern is filled with information about the action. Finally, auditing data are written to the input pattern if an action has been performed.

Several possible sources for errors exist in the UTA training. The user may have performed a wrong action, the UTA may not yet be trained enough to make the right decisions (although the UTA may think otherwise), or the requirements of the case for the UTA may have changed. To deal with these problems several corrective tools are implemented in the UTA.

Training—it is always possible to just ignore any error and continue training. The UTA should be able to adjust eventually to any new requirements. This is the simplest method, but the UTA may need a lot of input to make sense of contradictory data.

The 'Correct' method—This method should be called when the UTA makes bad decisions although it has been trained with good data. It is invoked using the UTA-History function on the pattern the UTA has acted upon. This method makes the UTA wait for user input when it would perform the action that has been corrected.

The 'Forget' method—This method should be called when the requirements of the case for the UTA have changed, and so some of the training input is no longer valid. The Forget method is invoked using the UTA-History function on the pattern the UTA has acted upon. This method makes the UTA ignore all training data that has corresponding to the action to be forgotten.

The 'Undo' method—This method should be called if a particular user action has been performed erroneously. The Undo method is invoked using the Training Data method on the UTA. It makes the UTA ignore the corresponding training datum.

An optional feedback pattern can be attached to the main pattern in the scope of an UTA. This feedback pattern then can contain information on the last action performed by an UTA, any problems encountered by the Actor module, or any proposed actions (especially desktop actions and Activities). Using the Rule Engine, this feedback pattern can also be used to provide more indications of the process state by setting the icon information or creating Activity methods callable by toolbox buttons. The feedback pattern is purely optional and is ignored by the Collector when collecting data. The feedback pattern can be shown as a sticker on a document.

The whole data needed by the Trainer module and the Actor module is stored in pattern storage in the repository and referenced to the UTA in the Knowledge Pattern and its child patterns. This includes the raw input data, cluster information, and the decision tree. The knowledge pattern is designed to be reusable by several different UTAs. So it would be possible to perform some 'basic training' for some general use case, and then copy the knowledge pattern to other UTAs where more specific training can be used to refine the decisions. The UTE has therefore the ability to rapidly reuse trained knowledge.

Processing speed of the Actor module scales well, and should not degrade overly when many patterns are in the scope of the UTA. The Trainer module may slow down when dealing with large scale problems. Although the time complexity for the training algorithm is actually $O(N^2 \log N)$, where N is the number of input samples, real time constraints so far are of the order $O(N)$, since the constant of the supquadratic term is much lower than the constant of the linear term. As the UTE is capable of working with multiple UTE-kernels in peer-to-peer mode, the Trainer can run on one server node, the Actor on another and the user interaction can be on the portal server.

The scope of an UTA can be divided into primary scope and secondary scope. Every time the user performs an action with an pattern in the primary scope it gets trained, and every time an pattern in the primary scope of an pattern gets modified the Actor module may get called.

Patterns in the secondary scope are the descendants of an pattern in the primary scope in the patterns hierarchy. They are taken into account for training and decision purposes but modifications of patterns in the secondary scope are not directly noticed by the Collector module.

Although it would be desirable to close this gap between primary and secondary scope, the effort needed to do so would be enormous.

The current implementation of the UTA can only perform one action per data pattern. Current research is directed at finding practical and well-performing solutions to the following problems.

Learning sample size—Since much more possibilities for actions are possible, more input samples for learning will be needed in most cases.

No error correction—It would not be possible anymore to correct user errors by training alone. The UTA cannot know without further input if an unusual action that does not fit the other trained data is justified, or not.

Technical complexity—This advanced feature would increase the overall complexity of the code.

The matrices obtained by comparing the features of two data elements can be interpreted as scaled covariance matrices. In order to express the similarity of the features in a single number we use the following algorithm.

Let $A=(a_{i,j})$ be an m×n matrix. We compute the row and column geometric means $$r_i = \left(\prod_{j=1}^{n} a_{i,j}\right)^{\frac{1}{n}}, \; c_j = \left(\prod_{i=1}^{m} a_{i,j}\right)^{\frac{1}{m}}$$

Using these numbers we compute row and column averages $$\bar{r} = \frac{1}{m}\sum_{i=1}^{m} r_i, \; \bar{c} = \frac{1}{n}\sum_{j=1}^{n} c_j.$$

Finally, the matrix distance function for the matrix A is given by $$\frac{1}{2}(\bar{r} + \bar{c}).$$

The Levenshtein Distance between two strings is given by the minimum number of operations needed to transform one string into the other, where an operation is an insertion, deletion, or substitution. It can be computed in O(mn) time and O(min(m,n)) space, where m and n stand for the lengths of the two strings. For our purpose, we will employ the scaled Levenshtein distance, defined by $$\lambda_s(s_1, s_2) = \frac{\lambda(s_1, s_2)}{\max(|s_1|, |s_2|)},$$

where $\lambda$ denotes the Levenshtein distance, and $|s|$ denotes the length of the string s. The scaled Levenshtein distance has the property, that $0 \leq \lambda_s(s_1, s_2) \leq 1$.

The task of the clusterer is to sort the filtered data into clusters of low internal variance. As a minimal requirement for clustering, one needs the possibility to obtain the distances between two data elements. Many clustering algorithms exist, each with its advantages and disadvantages. After a thorough research, the Single Linkage Hierarchical Clustering method was chosen.

Now a short description of hierarchical clustering methods is given.

As input, a list of data points is needed, and a method to compute the distances between them. As output a hierarchical list of clusterings is obtained. There, on the first level, each data point is its own cluster. At the next level there will be one cluster less and so on until at the last level all points will form one cluster.

The algorithm builds these clustering levels one at a time. It starts with the first level, where each data point is considered a cluster. At each step, the two clusters closest to each other are merged to one cluster. The hierarchical clustering methods differ by the way the distance between the clusters is computed. We present here the three most popular methods.

Single linkage—The distance between two clusters is given by the smallest distance between an element in one cluster to an element in the other cluster.

Complete linkage—The distance between two clusters is given by the largest distance between an element in one cluster to an element in the other cluster.

Average linkage—The distance between two clusters is given by the average of all distances of an element in one cluster to an element in the other cluster.

Advantages of hierarchical clustering are:

Generality—The hierarchical clusterer only needs a distance function to work. It is not even necessary (although advisable) for this function to induce a metric. Other clustering methods, like k-means clustering variants, often need additional structure to be present in the parameter space to compute cluster prototypes.

No prior knowledge—Hierarchical clustering methods only need the distances between the elements as input. This is in contrast to k-means clustering methods, which need the number of clusters (or a reasonable approximation, for more sophisticated methods) as an additional input.

Stability—Hierarchical clusterings always return the optimal (with respect to the given clustering criterion) clustering solution for the given elements, thus guaranteeing a stable and smooth transition if data elements are added or removed. This is in contrast to the k-means clusterers, which may be fooled by local minima in the target function.

Flexibility—From the different variations of the hierarchical clusterer (complete, single, and average linkage; and others exist) the one with the best performance in a given situation can be chosen.

Disadvantages of the hierarchical clustering are:

High time resources needed—Hierarchical clusterers needs at least $O(N^2)$ of time. Although this is significantly faster than graph-based clusterers (which need exponential time for optimal solutions, and polynomial time with higher exponents for heuristic solvers), k-means clusterers usually perform much faster.

Cutoff function needed—After hierarchical clustering a post processing step is needed to determine which one of the hierarchical clusterings is the best for the given problem.

No online functionality—Hierarchical clusterers have to be completely retrained for every change of the input data.

From practical and theoretical tests, the single linkage clusterer was found to be the best choice for the UTA, because clusters turned out to be elongated and chain-like along certain features.

The cutoff function employed for the UTA computes the average cluster purity, and the cluster stress s, and minimises the target value $$\frac{s}{p^4}$$

over all levels.

Ideally, all samples in a cluster should correspond to the same action, since actions should be unique for each data pattern. Cluster purity is measuring how homogeneous a given cluster is. The number of samples corresponding to each action are counted, and the maximum count m is recorded. The cluster purity is then given by where m/n, is the size of the cluster.

Cluster stress gives an overall measure for the quality of a clustering. It is inspired by physics formula on stress, and measures the effort needed to keep samples in one cluster together and to keep samples of different clusters apart.

The cluster stress s is the sum of the internal stress $s_i$ and the external stress $s_e$. Internal stress is computed by the formula $$s_i = \sum_C \sum_{u,v \in C} \frac{\overline{d}_C - d(u,v)}{\sigma + d(u,v)^2},$$

where the first sum runs over all clusters C in the clustering, the second sum runs over all pairs of samples in the cluster C, d(u,v) is the distance between the two samples, $\overline{d}_c$ is the average distance of all pairs of samples in the cluster C, and σ is given by $$\sigma = \frac{1}{N^4} \sum_{u,v} d(u,v)^2$$

where the sum runs over all pairs of samples, and N is the total number of samples.

External stress is computed by the formula $$s_e = \sum_{C_1,C_2} \sum_{u \in C_1} \sum_{v \in C_2} \frac{\overline{d}_{C_1,C_2} - d(u,v)}{\sigma + d(u,v)^2},$$

where the first sum runs over all pairs of clusters $C_1$ and $C_2$ in the clustering, the second sum runs over all samples in the cluster $C_1$, the third sum runs over all samples in the cluster $C_2$, d (u, v) is the distance between the two samples, $\overline{d}_{C_1,C_2}$ is the average distance of samples in $C_1$ to samples in $C_2$, and σ is the same as above.

A PQL—Pattern Query Language is used for goal defining rules, state-space pattern attribute changes and pattern searches across all nodes of an UTE. PQL is stored as a version controlled binary rule pattern in the repository and can be executed by users or UTAs with sufficient authority.

PQL is required because in a real-world situation users, operators and administrators do not see it as not productive that ALL pattern interactions have to be trained. PQL gives UTE users a sense of control in an otherwise complete dynamic and stochastic open-world state-space. PQL is not used to define concepts but requires these concepts to make sense. PQL is abstract and acquires meaning only at the time of execution when it is applied in real-time to a set of instance patterns. PQL rules can be called by the UTA as the EFFECT part of a decision pattern.

Figure 7:
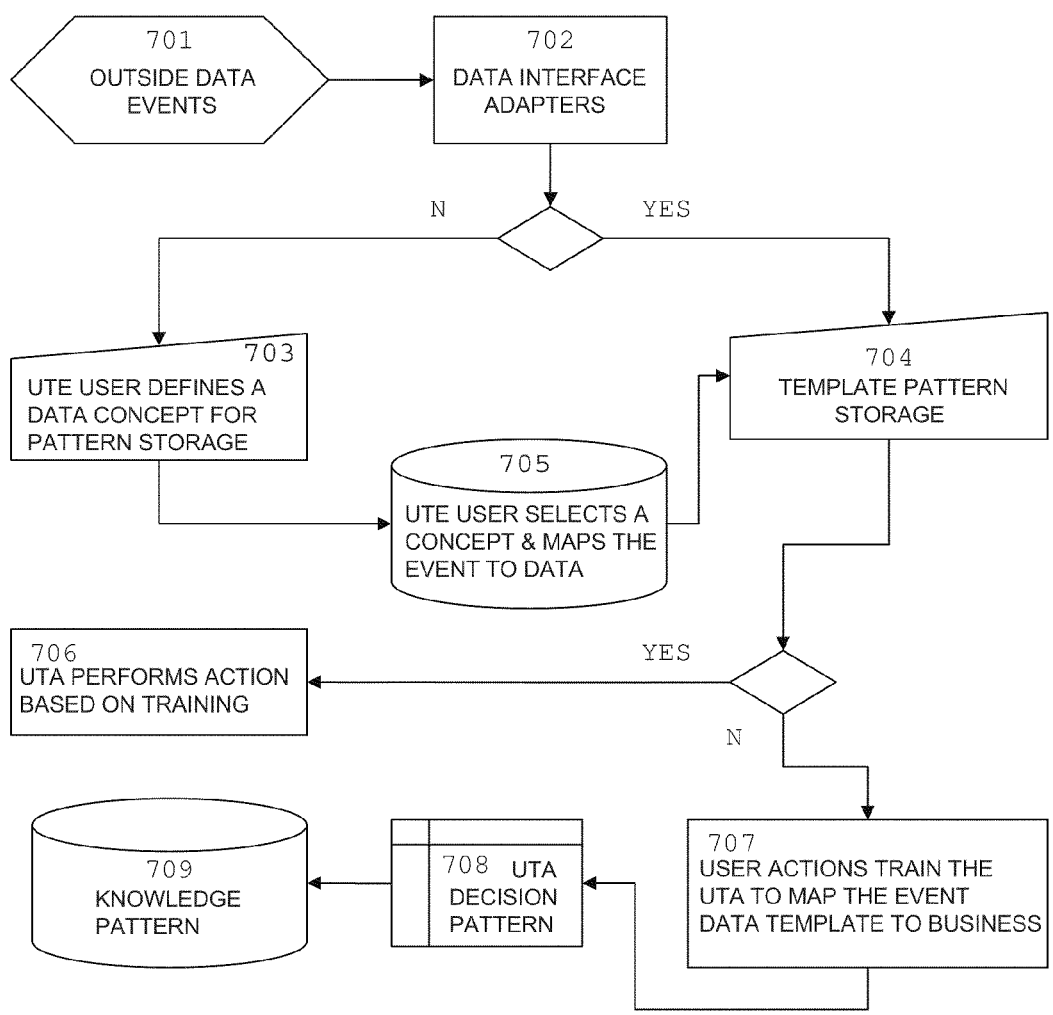
In FIG. 7 a flowchart is drawn explaining the event driven training of a business case.

In FIG. 7 a flowchart is shown explaining an event driven training of a business case. The UTE system offers a set of data-interface adapters 702 that can receive data-events from the outside 701. When such an event is unknown, a properly authorized user has to train a UTA to create a business case to deal with the event. The adapter uses a template—created by a UTE user previously or at this time—to map event data fields to concept attributes. The event creates an instance and populates it with event data. The instance is routed to the workspace of a UTE user. This user instantiates a business case template from patterns storage and adds the event instance to it. Then the UTA is trained with the activities that the UTE user performs on the business case.

If the data event is not known or a template does not exist in 703 the UTE user defines a data concept for pattern storage in a template pattern storage 704 using GUID's. In 705 the UTE user selects a concept and maps the event to data. If the pattern of the business case is known to the UTA, in 706 the UTA performs the action based on previous training. If not, in 707 the user actions train the UTA to map the event data template to the business. The UTA decision pattern 708 is stored to the knowledge pattern 709 using GUID's.

Figure 8:
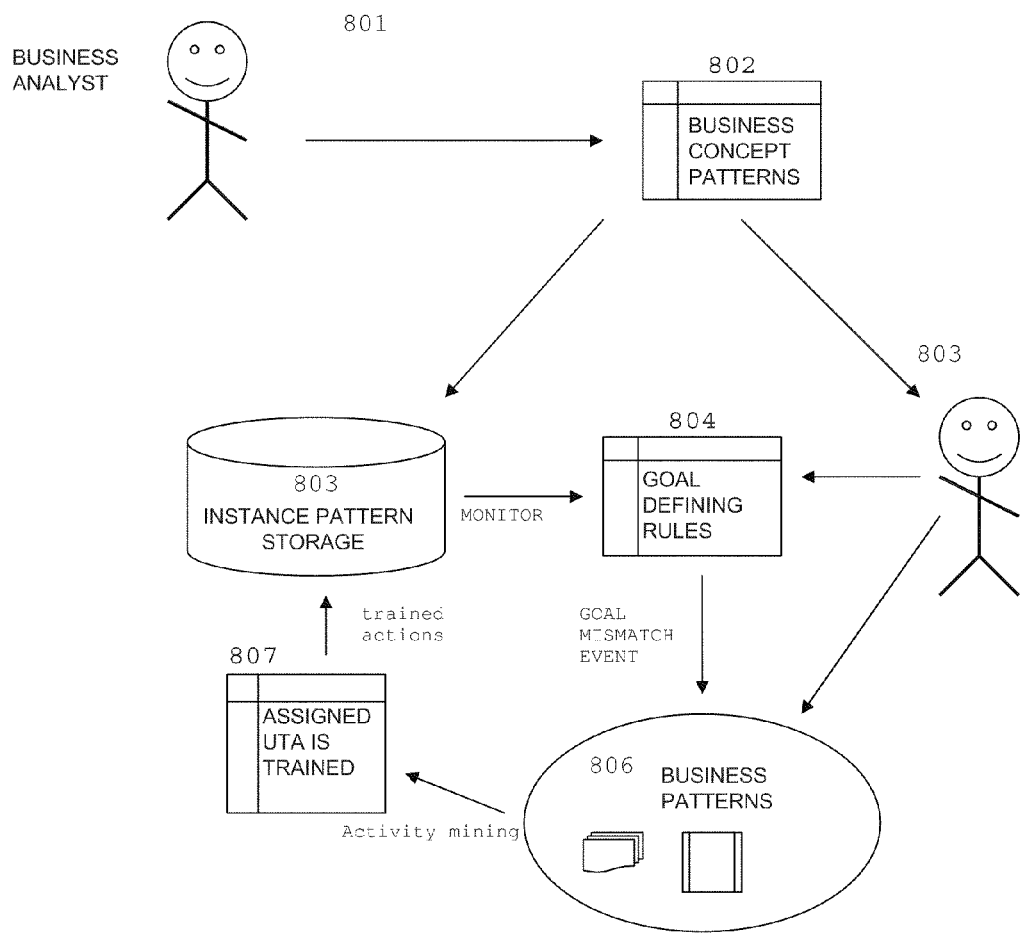
FIG. 8 shows a diagram to explain the goal driven training of a business case.

In FIG. 8 a goal driven training of a business case is shown. The UTE user defines concepts with goal-defining rules about attributes of business concepts. Once these concepts are instantiated and active, a mismatch of goal values are cause an event. This event is handled by a UTE user who starts a corrective process with a sequence of activities taken on a number of instance patterns, tools that are executed, and services that are called. The assigned workspace UTA of that user is trained accordingly. The trained knowledge patterns of the UTA are stored to process pattern storage. The process patterns are linked to the goal mismatch events and called by similar goal events.

The business analyst 801 defines the business concepts as business concept patterns 802. An UTE user activity creates instances, which are stored in the instance pattern storage 803. The business management 805 defines goal defining rules 804. A goal mismatch event is handled by an UTE user action on a cluster of business patterns in 806. The assigned UTA is trained accordingly in 807 (activity mining by user-trained agent UTA.

Figure 9:
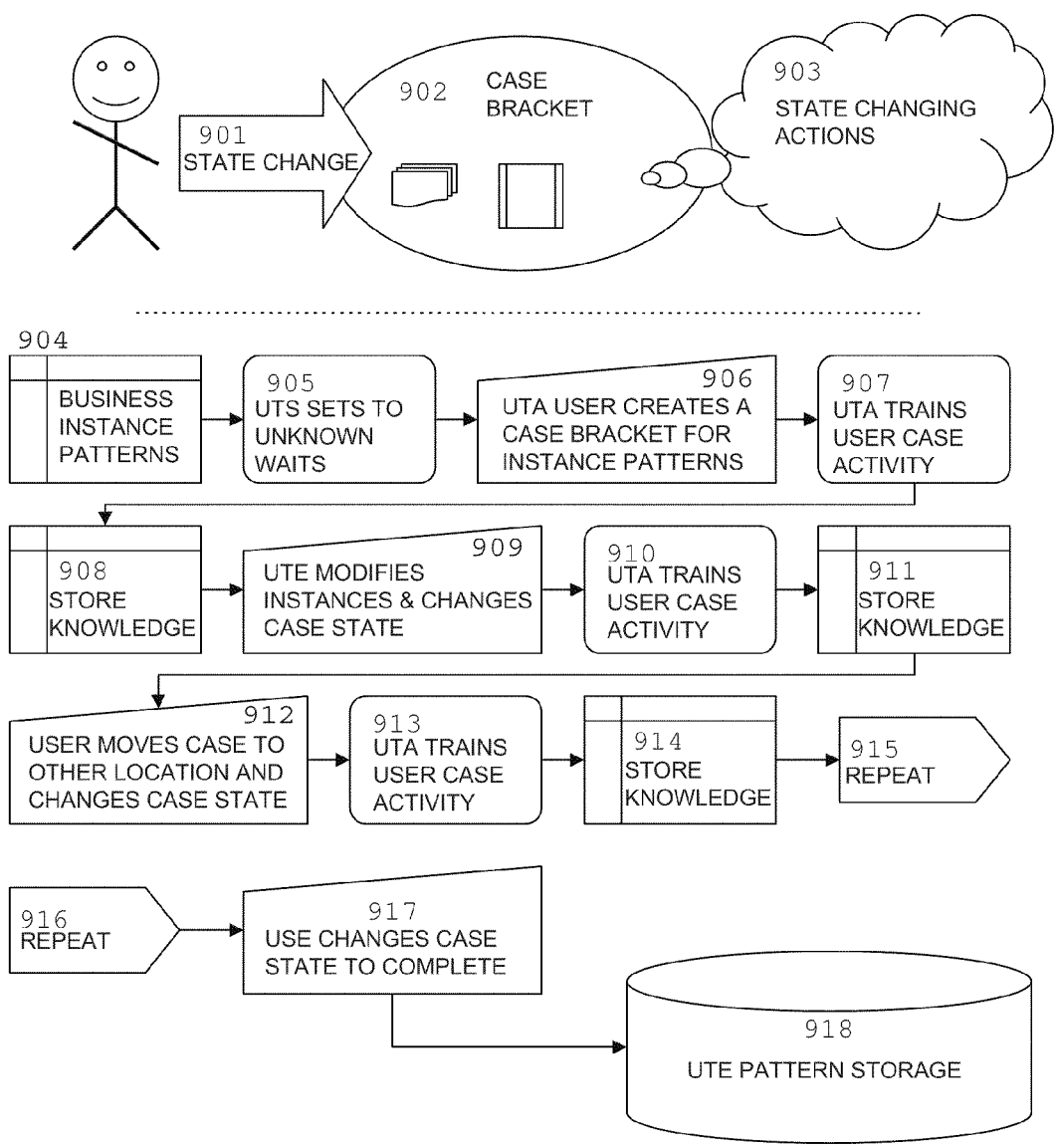
In FIG. 9 a flowchart is drawn explaining the process-UTA training for a new business case.

FIG. 9 explains in more detail a process-UTA training for a new business case. Once concepts, templates, views, user authorization, adapters and services have been defined business cases have to be trained. There are multiple ways to achieve that. If a principle process structure exists the training is described in the ORG-UTA diagram. A process oriented UTA are have a root and a scope to train and act. The root of a process UTA are be a CASE template. A process-UTA is triggered either by an external or internal event or by a UTE user that instantiates a CASE template. Any number of related business concepts can be instantiated within a CASE bracket.

A user causes state changes 901. A number of related business concepts can be instantiated within a case bracket 902 for a cluster of patterns. The UTA monitors change events and collects state changing actions (903).

The shown boxes are entitled as follows:

904: Business instance patterns, 905: UTA sets to unknown waits for waits, 906: UTE user creates a case bracket for instance patterns, 907: UTA trains user case activity, 908: store knowledge, 909: UTE modifies the instances and changes case state, 910: UTA trains user case activity, 911: store knowledge, 912: user moves case to other location and changes case state, 913: UTA trains user case activity, 914: store knowledge, 915, 916: repeat, 917: user changes case state to complete and archives is and 918: UTE pattern storage.

Figure 10:
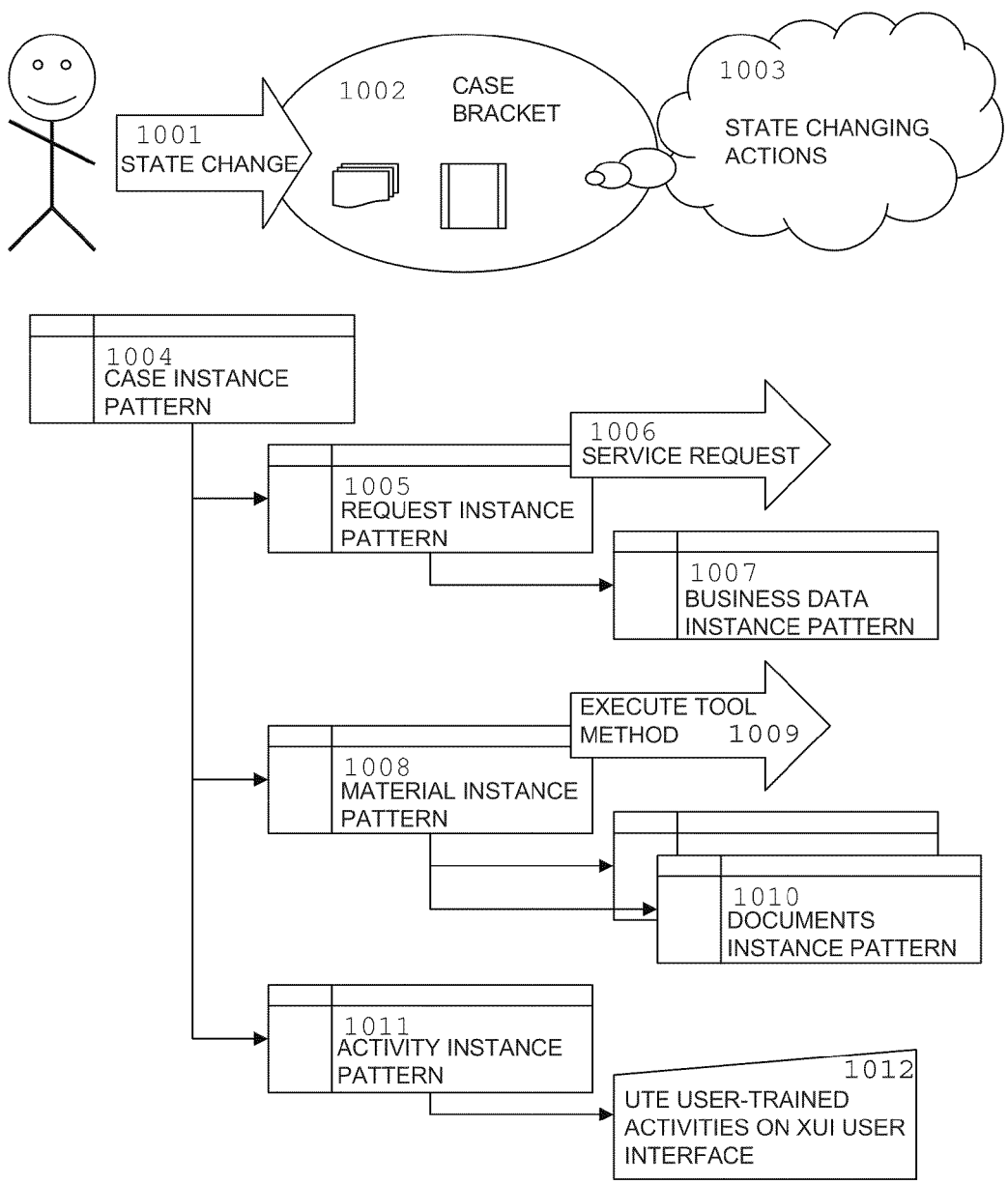
FIG. 10 shows a diagramm to explain the ORG-UTA predefined case routing.

In FIG. 10 an ORG-UTA predefined case routing is explained. Once concepts, templates, views, user authorization, adapters and services have been defined business cases have to be trained. If a principle process structure exists the ORG-UTA can be used. Any number of related business concepts can be instantiated within a CASE bracket. This model is used where a more formal BPM Business Process Management approach is preferred and a well defined organization with clearly structured processes already exists. The advantage over typical workflow programming is the UTE does not require RULE coding but the workflow rules and how a case steps through the organization is trained. Services, tools and user activities can be freely intermixed.

A user causes state changes 1001. A number of related patterns can be instantiated within a case bracket 1002 for a cluster of patterns. The UTA monitors change events and collects state changing actions (1003).

The shown boxes are entitled as follows:
1004: case instance pattern, 1005: request instance pattern, 1006: service request (SOA), 1007: business data instance pattern, 1008: material instance pattern, 1009: execute a tool method, 1010: documents instance pattern, 1011: activity instance pattern, 1012: UTE User-Trained activities on XUI user interface. Relationship pointers link the patterns to the case which carries a summary state that is used to route the case from org-unit to org-unit.

Figure 11:
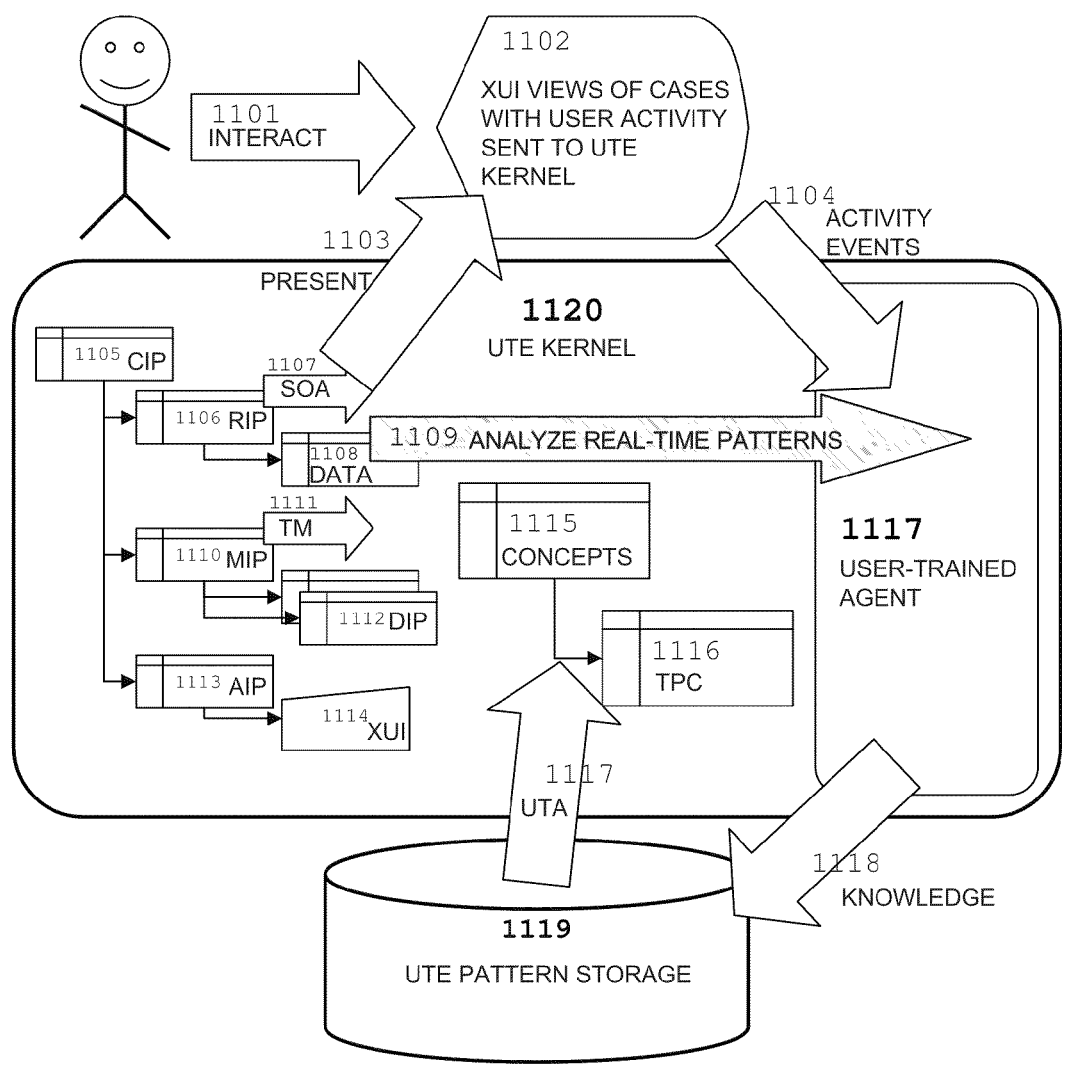
FIG. 11 shows a diagramm to explain the real-time activity mining in memory.

FIG. 11 shows a diagramm with respect to enabling real-time activity mininy in memory.

Activity Mining is performed on concept model patterns, concept relationship patterns, user activity patterns, process patterns, presentation patterns, real-time transaction data patterns and previously trained knowledge patterns. These patterns are binary information structures created by dynamically combining design concepts with real-time machine/robot operations or business data. The learning as well as execution is performed within the UTE without the need for intermediate knowledge engineering. The User-Trained Agent (UTA) executes the trained knowledge on the same concept items previously used for training. The UTA is real-time trained by concept-state-changing activities on any reappearing patterns and pattern relationships within concept-, template- and instance-storage, regardless of how they are stored. The real-time performance is achieved by caching all concepts (i.e. UML), execution logic (i.e. Java code), and production data (i.e. SQL query) from storage in the UTE random access memory.

The shown boxes are entitled as follows:
1101: interact, 1102: XUI views of cases with user activity sent to UTE kernel, 1103: present, 1104: activity events, 1105: case instance pattern (CIP), 1106: request instance pattern (RIP), 1107: service request (SOA), 1108: Business data, 1109: analyze real-time patterns, 1110: Material instance pattern (MIP), 1111: execute a tool method (TM), 1112: Document instance pattern (DIP), 1113: Activity instance pattern (AIP), 1114: UTE user XUI activities (XUI), 1115: Concepts, 1116: template pattern constructor (TPC), 1117: User-Trained agent (UTA), 1118 Knowledge, 1119: UTE pattern storage, 1120 UTE Kernel.

Figure 12:
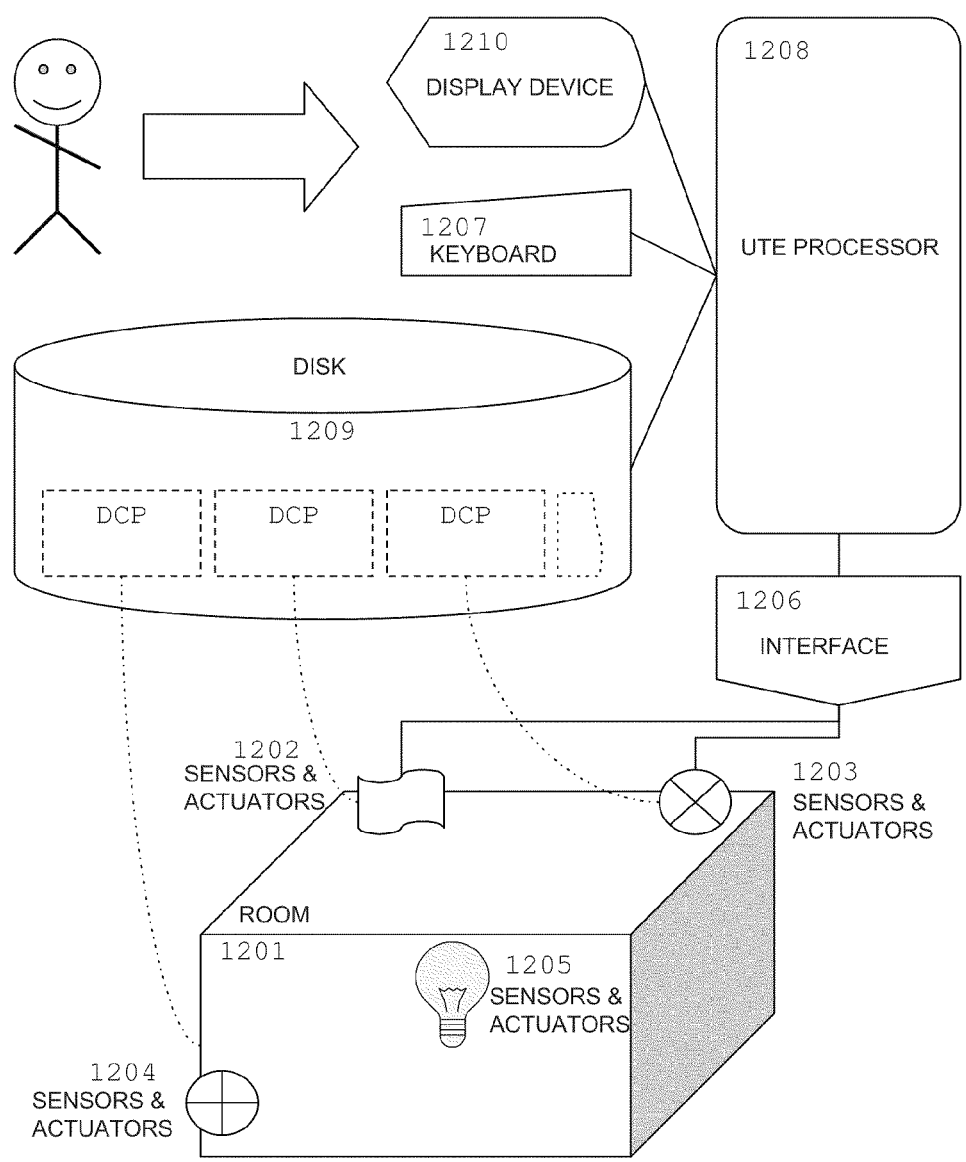
FIG. 12 shows in a diagramm a first sample application for home automation.

FIG. 12 shows a real-world engineering application in home automation. This sample application describes a home automation system, but can be applied to any kind of process management system that is composed of sensors, control switches and actuators that interact with humans. This can be applications for controlling a car, a naval vessel, a manufacturing system or any other human interactive system.

In this basic application sample the involved elements are a room 1201, a motion sensor 1202, a light level sensor 1203, a light switch 1204, and a light source 1205 controlled by the switch. The UTE system is built from the interface 1206 to sensors and actuators, a keyboard entry device 1207, a processor 1208 with UTE software, a disk-drive 1209, and a display device 1210.

The system operator 1212 uses the keyboard 1207 and display device 1210 to interact with the program 1208 to create conceptual descriptions of the elements of the real-world system by means of describing the attributes, possible states and possible actions to be performed. These are stored as descriptive concept patterns DCP in UTE pattern storage on disk 1209 in the format described in FIG. 1.

The system operator then maps the DCP to the interface board 1206 that is connected to the actual sensors and actuators 1202, 1203, 1204, and 1205. The UTE processor 1208 can now change the status of the DCP attributes stored on disk 1209 as per the signals received from the interface 1206 and display them via display 1210. The DCP can also be displayed via the display device 1210 and a user can perform actions on the actuator 1204 by entry through the keyboard 1207, which is routed by the processor 1208 through the interface 1206.

The DCP for the room 1201 is used a root or scope element that has reference pointers to the DCPs for 1202, 1203, 1204, and 1205.

The operator activates a User-Trained Agent UTA performing in processor 1208 to monitor the DCPs stored on disk drive 1209 by defining the abstract DCP of room 1201 as its scope.

If a person now enters the room then the motion sensor will activate and its signal will be sent via the interface 1206 to be received by the processor 1208 and change the status of its DCP attributes stored on disk drive 1209.

The change event of an element in the scope of the UTE program in processor 1208 will activate the UTA program component. The DCP descriptions contain definitions that distinguish various ACTIONS on elements to be relevant or irrelevant for the Transductive Training. This is important as otherwise the system 1208 is overloaded with events that have to be filtered. In this sample the only ACTIONS that are relevant is the ON and OFF action on the light switch 1204.

If the interface 1206 now informs the processor 1208 that the ACTION ON for the light switch 1204 has been performed then the UTA program in 1208 will analyze all the attribute patterns of the DCPs in the scope of the room 1201 for the current status and create a knowledge decision pattern (KDP) for this action.

Every time an ACTION is performed such a KDP is created in REAL-TIME by the UTA program in processor 1208 and a decision tree is built by means of the mathematics described and stored as part of the KDP.

On each change event from the interface 1206 to any of the DCPs in the scope of the UTA, the decision tree stored on disk 1209 is checked by the UTA program in processor 1208 to see if there is a matching KDP. Once a certain threshold of repeated patterns is reached the UTA program in processor 1208 will send a signal via the interface 1206 to perform the ACTION to the light switch 1204 that will turn on the light source 1203.

It will for example store the KDP patterns ACTION(ON) =motion.sensor.state(active) & light.sensor.state(dark). For ACTION(OFF) it will learn motion.sensor.state(none) & light.sensor.state(light). For motion.sensor.state(active) & light.sensor.state(light) there will be no actions trained.

This setup seems overly simple and it is. It would not require a user-trained agent to work because a few simple rules could do the same. Much more complex scenarios with many interdependencies benefit from the transductive training with the UTA. If for example the light is dimmed to a certain level when the TV is switched on, or there are multiple lights in the room and dependent on the number of people and the activities they perform they are used differently.

Optionally each person in the room carries a RFD (radio-frequency-detectable) card in the pocket that identifies it to the UTA as another abstract entity in the scope of the UTA monitoring. Then the preferences of these persons would be transductively trained as they perform typical actions. Possibly conflicting actions have to be weighted by the KDP decision tree, proposed and if necessary resolved by corrective input through the keyboard from the persons involved. Such a scenario becomes already nearly impossible to encode in a rule and preference database.

Figure 13:
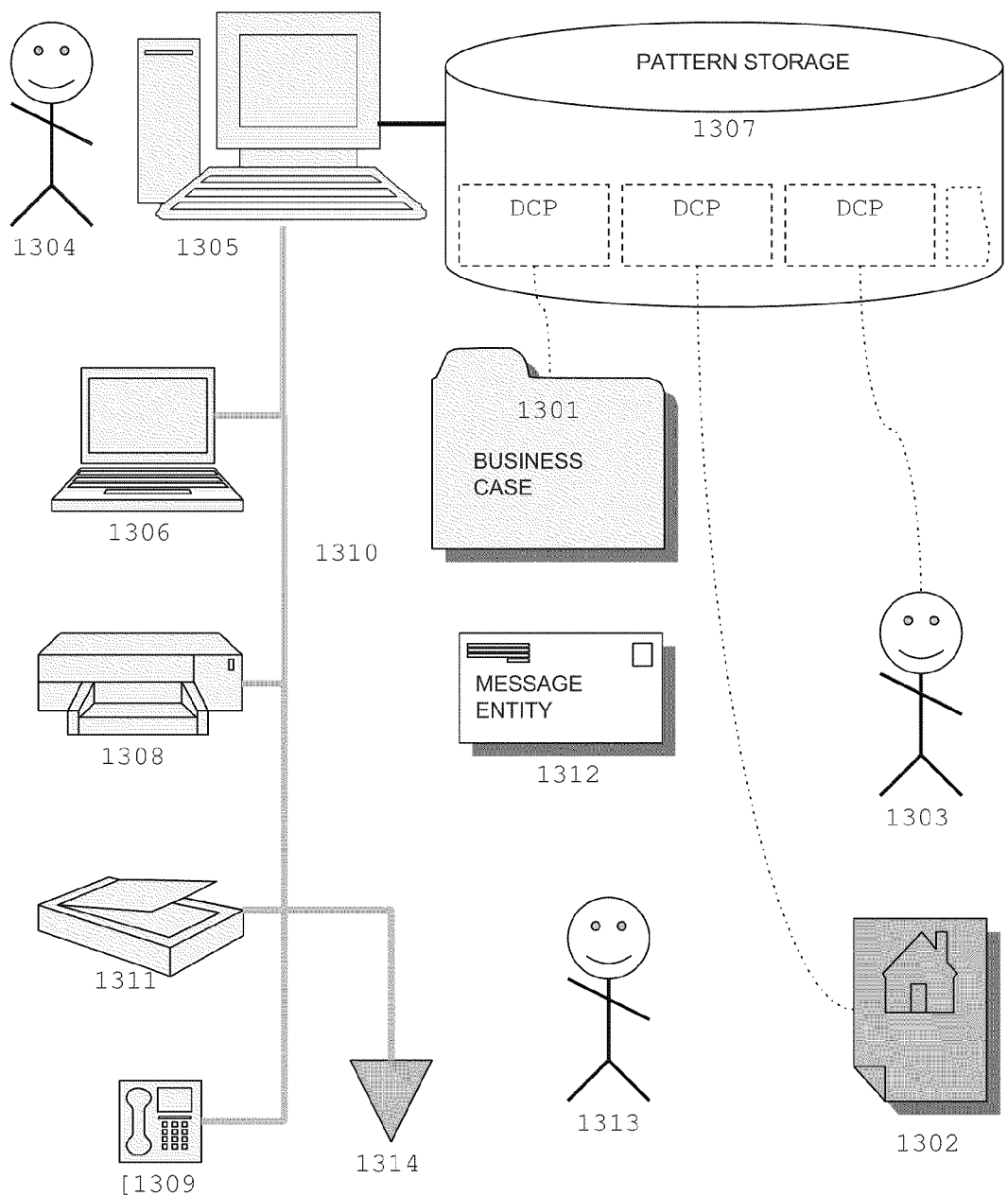
FIG. 13 shows in a diagramm a second sample application for a business process management.

FIG. 13 helps to explain a Real-world Business Process Application with Documents and shows the technical functionality.

FIG. 13 describes a sample application for business process management. The operator uses a computer system consisting of multiple processors such as 1305 and 1306 connected by computer network 1310 to model the real world items to UTE patterns storage. The users then interact with the computer system to train the business processes into decision patterns related to descriptive concept patterns (DCP) of persons, real-world items, documents and manual activities.

All items in this diagram are modeled by the operator 1304 by means of keyboard input via the computer 1305 and its UTE software program as concepts into UTE pattern storage 1307. The concepts of (1301) through (1303) within storage 1307 are just shown as representatives. This modeling includes office devices such as a printer 1308, a scanner 1311 and a telephone 1309, which are mapped to their respective hardware interface and driver program. It includes business internal persons such as the insurance clerk 1313 and a customer person such as 1303 with all their relevant attributes and role information.

To work with those modeled items in the UTE environment they are instantiated (copied with a new GUID) into pattern storage 1307 and populated with case specific data values and referenced to other instances by an authorized user such as insurance clerk 1313 via the display device of computer 1305 as needed, and are for example grouped into a business case such as 1301.

In a state-of-the-art software program these elements are encoded into program code and stored in data base tables. There is no distinction between concepts, templates and instances, as the concepts only exist in the program source code and to a lesser extent in the data base table description. To store program interior instances to long-term storage a C++ or Java program has to serialize its internal data into data base tables. The UTE software does not perform such an operation but simply moves the binary bitmap pattern from the internal memory of computer 1305 to pattern storage 1307.

In this sample application a new business process is encountered that has to be trained. It involves at first the customer 1303 who desires to receive an insurance contract to be provided by insurance clerk 1313. The customer 1303 fills out an application form and sends it to the insurance company using the UTE system via mail, fax, or email.

One of the inbound devices 1308 will receive such a message entity 1312 and store it in pattern storage as an instance of a concept. The UTE software in computer 1305 will start a classification process, open a business case 1301 and attach the inbound pattern of 1312.

The clerk 1313 will now be required to identify the inbound entity 1312 via the display device of computer 1306. The information is stored on disk 1307 by the UTE program in 1305 to build a decision pattern for classification of similar documents.

The clerk 1313 retrieves the necessary concepts from UTE pattern storage (also called the Repository), instantiates them and creates references to the business case 1301.

The clerk 1313 calls program interfaces to external IT systems via SOA connector 1314 to populate the business case and the document with insurance policy data. He retrieves text components to add from the patterns storage. Then he sends the case to a higher authority clerk 1313 (equals references that users inbox pattern) for signoff.

The clerk 1313 routes the document to one of the outbound devices 1308 so that it gets send to the customer 1303.

The UTA learning component of the UTE software in 1305 stores the decision patterns of all the previous actions of clerk 1313 and other persons into disk 1307 in real-time.

The above Steps 5) to 10) will be repeated a number of times. Once enough repetitions of similar actions have been trained the knowledge pattern of the UTA will either decide to perform the action immediately or recommend an action to the role of clerk 1313.

All other processes involving the said components can be trained in the same way. Knowledge patterns are not process bound but atomic and can be reused in different business cases (processes).

Figure 14:
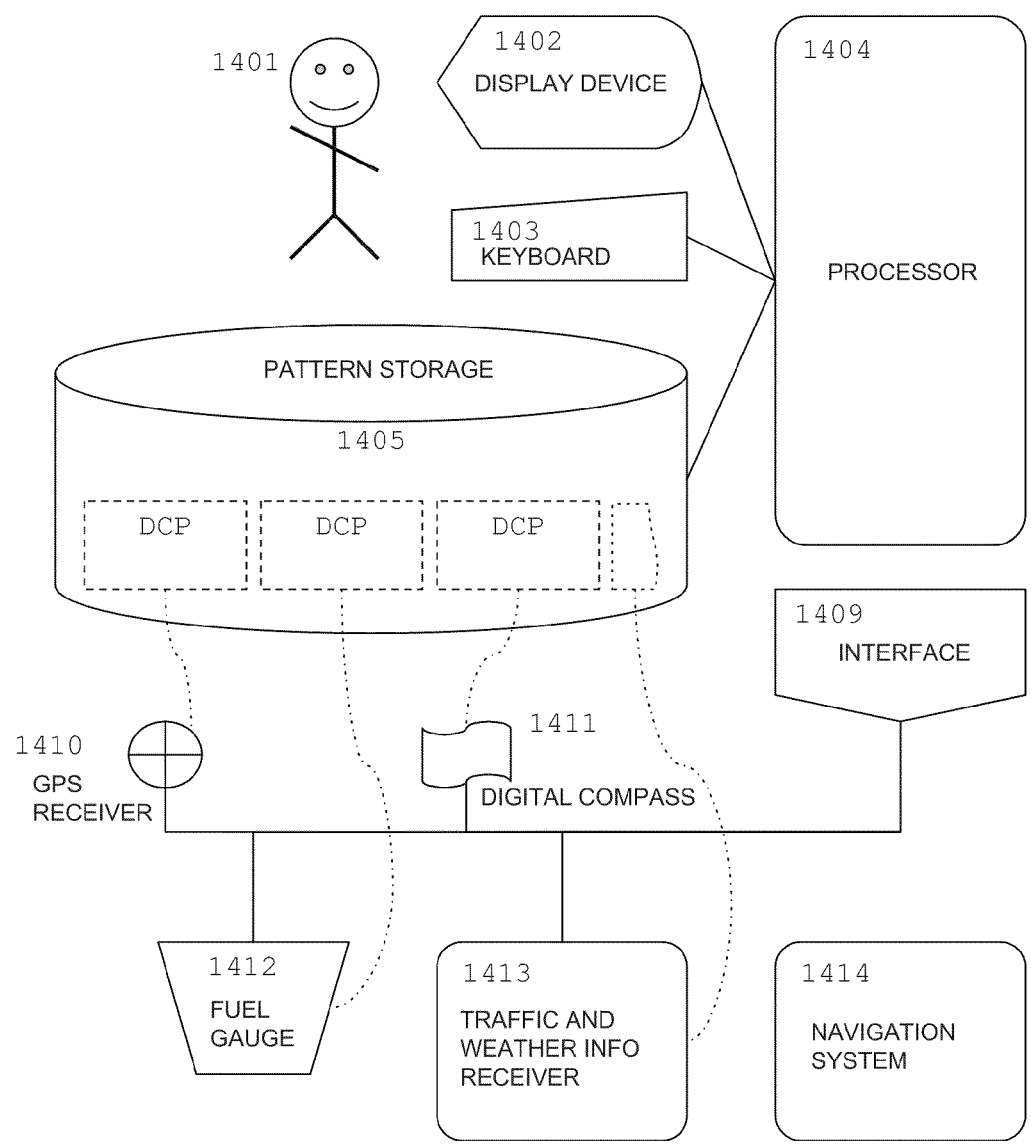
FIG. 14 shows in a diagramm a third sample application in a navigation system.

The diagram of FIG. 14 helps to explain a technical real-world sample application in cooperation with a navigation system.

This sample application describes the UTE in cooperation with a navigation system for road vehicles, naval vessels or airplanes.

The system consists of UTE processor with a display device 1402, a keyboard 1403, a processor 1404 with UTE programs and a computer memory or computer disk 1405. The processor 1404 is interfaced via the interface 1409 with a navigation system 1414 with a map processor and a route finder and with the sensors 1410 to 1413 whose values are mapped to pattern storage 1405 via DCP such as 1406 to 1408. The sensor 1410 is GPS receiver, the sensor 1411 a digital compass, the sensor 1412 a fuel gauge, the sensor 1413 a traffic and weather information receiver.

The user C1401 enters a desired target location via the keyboard 1403. This information is stored as a target route in the computer disk memory 1405 by the processor 1408 and passed via the interface card 1409 to and processed by the navigation system 1414.

The navigation system 1414 proposes then a route to user 1401. The UTE software stores a unique route identifier in its pattern storage 1405. If the user (driver) 1401 chooses not to follow the route directions given by the navigation system 1414, then the UTE program 1404 analyses the information patterns of time, location, weather, traffic, fuel situation or other information patterns received via sensors such as 1410 to 1413 and creates a recommendation decision tree related to the unique route identifier that is stored in pattern storage 1405.

If the driver 1401 makes similar route decision more often than the threshold setting in the UTE, then the next time that route or a part of that route to the target is chosen the UTE processor 1404 will override the route proposal of the navigation system 1412.

Route decisions by the user 1401 are stored with their relevant decision patterns in 1405 and after a threshold of repeated similar decisions is reached the processor 1404 will overlay the route recommendations of 1414 with those calculated from the DCPs in 1405.

Alternatively multiple route options can be presented to the user 1401 via display 1402 who then chooses one of the route options via keyboard 1403. That choice is trained as a route decision into DCPs stored in pattern storage 1405.

A goal based decision pattern can also be created by processor 1404, where decision trees are valued with goal achievement values (shortest time or route).

Glossary And Abbreviations:
- Adapter An interface that receives or sends data events for the UTE
- Attribute A data element of a concept that describes its features
- AM Activity Mining
- Activity sequenced or not user interaction with business patterns
- Concept An abstract description of Pattern properties (in Java: CLASS)
- DCP Descriptive Concept Pattern
- GUID Global Universal Identifier
- Factory A workspace that uses Rules or an UTA to process Instances
- Instance A unique data-bearing one-time use of a Concept or Template
- KDP Knowledge Decision Pattern
- Machine-Learning Software programs that learn function from historical input data
- Message An information pattern that is sent by means of an Adapter
- Model A virtual representation of real-life created from DCPs
- Material A concept that describes how Patterns are processed by a Tool
- Pattern A recurring structure of information content (encoded and not)
- Request A Concept that describes how Patterns interact with a Service
- Rule A Concept that describes an atomic interaction with a Pattern
- Service A programmed function that is not controlled by the UTE
- Scope The defined training and action range of a UTA (workspace)
- SOA Service Oriented Architecture
- Template A Pattern that describes how a Concept is be used in an application
- Tool A programmed function that is controlled by the UTE
- TX-ID Transaction Identifier (drawing 1)
- Type A record type identifier (drawing 1)
- UTA User-Trained Agent
- UTE User-Trained Environment
- View A presentation pattern created with XUI
- XUI Extendable User Interface

What is claimed is:

1. A method for training a system to specifically react on a specific input, comprising:
    defining a set of binary data structures, each data structure representing an abstract description of a certain type of a real-world component, item, or virtual object, and each data structure comprising a feature of said represented type of component, item, or object, its possible states, its attributes, its possible actions to be performed, and possible relationships between other of said components, items, or virtual objects;
    storing each of the binary data structures directly as a binary pattern in a computer memory or a disk memory;
    creating uniquely identifiable copies of the binary data structures to represent an individual instance of said types of components, items, or virtual objects;
    creating a virtual state space of said individual types of components, items, or virtual objects by grouping them as relevant for a specific situation;
    receiving in real time data describing a human user's interactions with said real-world components, items, or virtual objects;
    modifying the virtual state space for the specific situation in response to the human user's interactions;
    receiving via keyboard input, sensor devices, or other technical means changes of status or attribute values of at least one of said components, items, or virtual objects;
    storing said received changes as a new version of the respective data structure, representing the changed status and transition process of said individual components, items, or virtual objects;
    analyzing similarities of said binary patterns stored in said computer or disk memory related to a particular action performed;
    searching for a match in said binary patterns of said data structures; and
    if at least one matched binary pattern of said data structures is identified, proposing or automatically performing at least one possible action related to the matched binary pattern.

2. The method according to claim 1, further comprising storing said received changes as a new version of the respective data structure while retaining the previous version in said binary pattern in said computer memory or disk memory.

3. The method according to claim 1, further comprising:
    receiving in a training phase actions performed on the individual components, items or virtual objects by an identified type of operator via keyboard input, sensor devices or other technical means; and
    creating a decision pattern map of all data structures in the virtual state space for each repeatedly received action.

4. The method according to claim 3, wherein during the training phase only changes in the virtual state space caused by a specific action are collected and other automatically generated changes are excluded from collection.

5. The method according to claim 4, wherein the changes caused by a specific action are distinguished from other changes by marking or by a heuristic method scanning the actions done for typical characteristics.

6. The method according to claim 3, further comprising:
    storing as abstract causal data patterns snap-shot information from the individual binary data structures in the virtual state space of the point in time when said identified operator performs a specific action;

calculating a mathematical distance between said causal data patterns to create pattern clusters, reducing the amount of data needed to search for recurring patterns in said virtual state space;

building a decision tree using said causal pattern clusters using the calculated mathematical distance;

using said decision tree to identify an abstract causal data pattern in the individual data structures of an individual state space upon the occurrence of a change event in the state space;

using the abstract causal data in the decision tree to find a similar pattern in another individual state space; and using gathered training information stored in the decision tree from operator actions in previous situations to propose probable actions to the same kind of operator in future similar situations without intermediate offline processing of collected training data.

7. The method according to claim 1, wherein said at least one action corresponding to said identified binary pattern is proposed or caused only if the number of found repeated patterns exceeds a given specific threshold value.

8. The method according to claim 1, further comprising:
defining relevant actions of said data structures; and
storing changed binary data structures as new versions only if at least one of said relevant actions is performed.

9. The method according to claim 1, wherein the step of defining said set of binary data structures is performed via a keyboard, via sensory devices, via voice or via image recognition.

10. The method according to claim 1, wherein each of said binary data structures is stored directly and identically in a binary data format to computer random access memory or computer disk, comprising binary sequences encoding the type, a global unified identifier, a version or sequence number and a transaction ID for said structure that describes a component, item or virtual object.

11. The method according to claim 1, wherein the binary data structures are stored in said computer memory or disk memory in an encrypted format.

12. The method according to claim 1, wherein the description of each binary data structure, describing components, items or virtual objects, comprises attributes, attribute properties, possible value ranges of the attributes, access privileges and policies, state definitions, state pre- and post constraints, state transitions, transition change events, state changing event listeners, action definitions, action mapping to system internal functions, state changes and child and parent relationship definitions describing references to other data structures.

13. The method according to claim 1, wherein the set of binary data structures is stored on a computer memory and on a disk memory.

14. The method according to claim 1, wherein said binary data structures or said binary data patterns are exchanged via internet or other data lines between different computer systems.

15. The method according to claim 1, wherein said computer memory is a computer random access memory.

16. A computer system comprising:
at least one processor,
a computer memory, in particular a computer random access memory, or disk memory;
a number of hardware interfaces for connecting individual components or items; and
an operator input/output interface to interact with virtual objects, designed to execute the method according to claim 1.

17. A computer system according to claim 16, further comprising a computer network interface to link multiple computer systems.

18. A computer program product stored in a computer readable storage medium, for enabling a computer to execute a method according to claim 1.

19. A computer program product embodied in a computer system comprising at least one processor and a memory for enabling a computer to execute a method according to claim 1.

* * * * *